United States Patent [19]

Zenk et al.

[11] Patent Number: 4,590,586
[45] Date of Patent: May 20, 1986

[54] FORCED CLEAR OF A MEMORY TIME-OUT TO A MAINTENANCE EXERCISER

[75] Inventors: Daniel K. Zenk, Stillwater; Wayne A. Michaelson, Lake Elmo, both of Minn.

[73] Assignee: Sperry Corporation, N.Y.

[21] Appl. No.: 630,140

[22] Filed: Jul. 12, 1984

[51] Int. Cl.⁴ .................. G06F 12/00; G06F 11/00
[52] U.S. Cl. .................................. 364/900; 371/21; 371/62
[58] Field of Search ... 364/900 MS File, 200 MS File, 364/551; 371/16, 21, 51, 62; 365/201

[56] References Cited

U.S. PATENT DOCUMENTS

| | | | |
|---|---|---|---|
| 3,751,649 | 8/1973 | Hart, Jr. | 371/21 X |
| 3,916,384 | 10/1985 | Fleming et al. | 364/200 |
| 4,181,974 | 1/1980 | Lemay et al. | 364/200 |
| 4,236,208 | 11/1980 | O'Keefe et al. | 364/200 |
| 4,371,949 | 1/1983 | Chu et al. | 364/900 |
| 4,456,995 | 6/1984 | Ryan | 371/21 |

Primary Examiner—James D. Thomas
Assistant Examiner—William G. Niessen
Attorney, Agent, or Firm—William C. Fuess; Glenn W. Bowen

[57] ABSTRACT

A maintenance exerciser makes requests of certain inoperative and malfunctioning storage memory bank portions of a large scale storage memory unit concurrently that normal system requestors do request of remaining, correctly functional, storage memory bank portions of such storage memory unit. All requests are collectively prioritized in a priority network which, save for the circuit of the present invention, will not advance to successive prioritizations until each currently prioritized request is positively acknowledged by the requested storage memory bank. When the maintenance exerciser makes abundant and repetitive requests to storage memory banks which are non-responding, resulting that such requests would time-out save for the circuit of the present invention, then such requests of the maintenance exerciser which would time-out would, by suspending successive prioritizations, significantly impede the concurrent access of normal system requestors to remaining correctly functional and responsive storage memory banks. A time delay circuit accomplishes a forced clear of an unacknowledged request from a maintenance exerciser to an unresponsive storage memory bank in the present invention, thereby simultaneously forceably precluding, or clearing, that the maintenance exerciser should experience a time-out to the requested memory while allowing the priority network to continue successive prioritizations.

3 Claims, 13 Drawing Figures

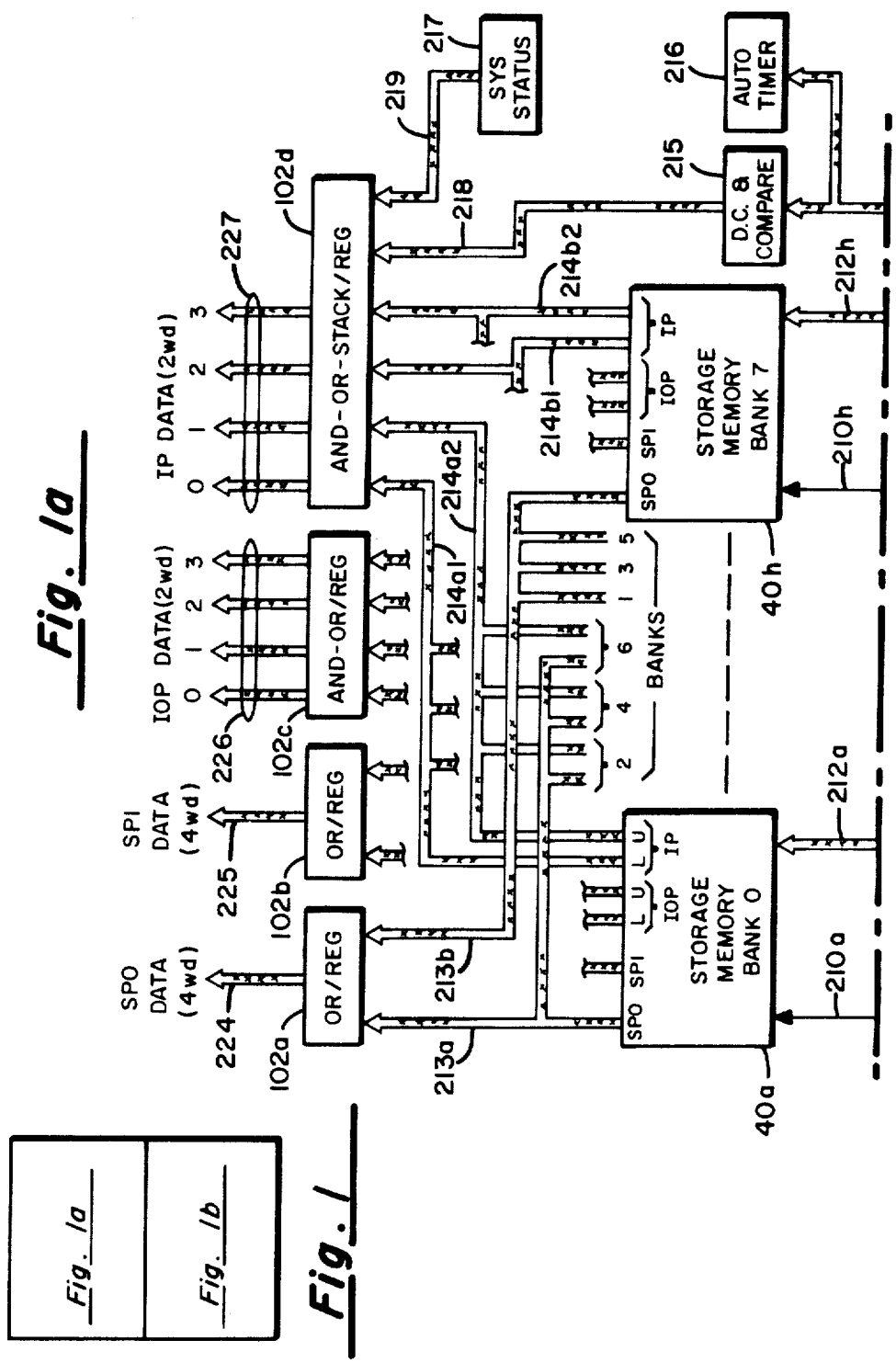

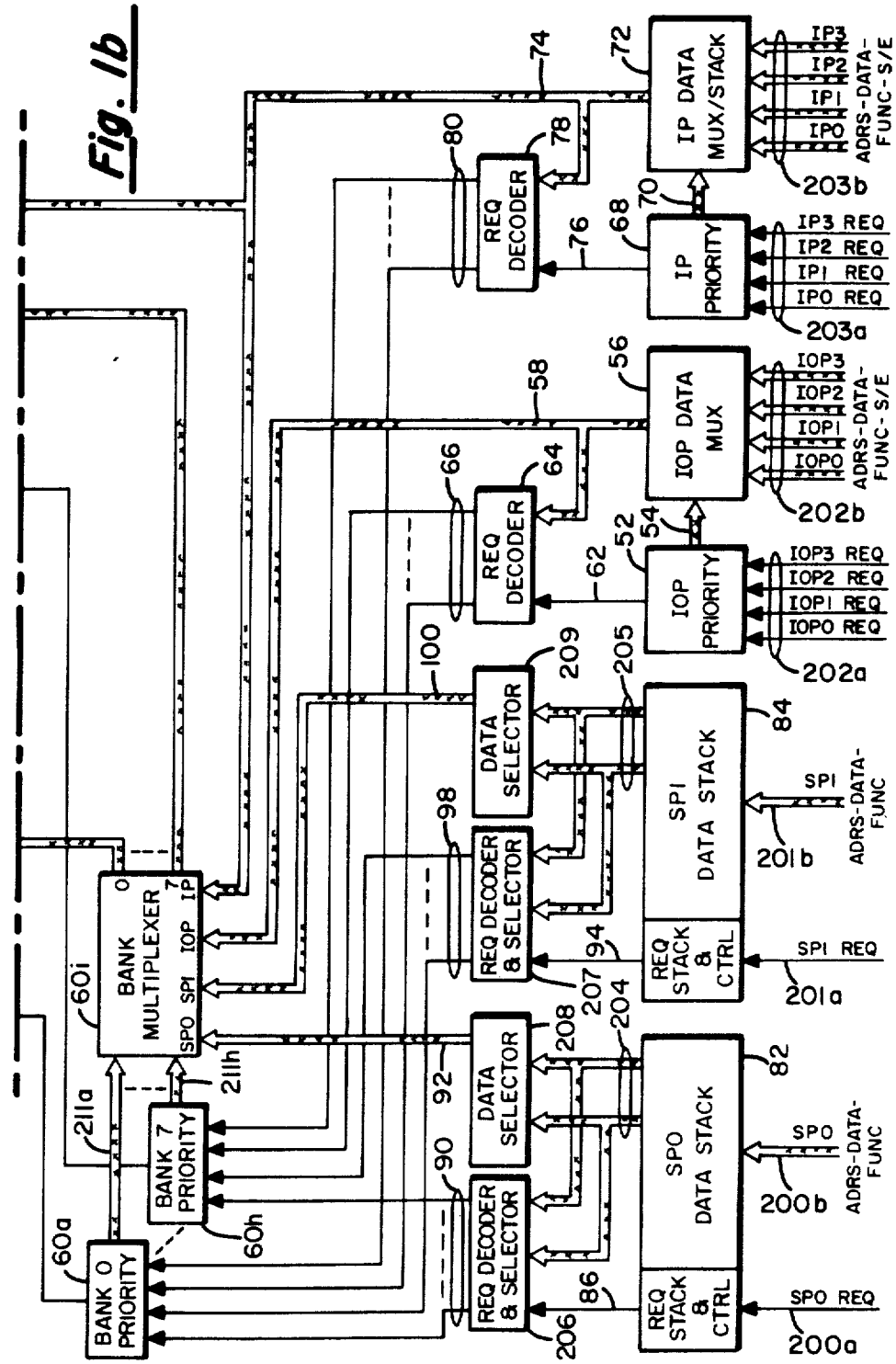

FORCED CLEAR OF A MEMORY TIME-OUT TO A MAINTENANCE EXERCISER

REFERENCE TO RELATED APPLICATIONS

The instant application claims subject matter related to, and a circuit apparatus contained within a memory apparatus taught within, another patent application filed on Apr. 2, 1984, the other application being further identified as:

U.S. Ser. No. 596,130 entitled "High Performance Storage Unit", filed in the name of J. H. Scheuneman.

The instant application also claims subject matter disclosed in a related application filed on the same day as the instant application, such other related application being further identified as:

U.S. Ser. No. 630,141 entitled "Modified Spanshot Priority Enabling Two Requestors to Share a Single Memory Port" filed in the names of D. K. Zenk, et al.

All three applications are assigned to common assignee Sperry Corporation, a corporation of the State of Delaware having a place of business at 1290 Avenue of the Americas, New York, N.Y. 10019.

The instant application is related to the following co-pending patent applications:

Title: MULTIPLE OUTPUT PORT MEMORY STORAGE MODULE
Inventor: James H. Scheuneman and Gary D. Burns
Ser. No.: 596,214
Filed: Apr. 2, 1984

Title: READ ERROR THROUGH-CHECKING SYSTEM
Inventor: James H. Scheuneman
Ser. No.: 354,340
Filed: Mar. 2, 1982 now U.S. Pat. No. 4,351,213

Title: READ ERROR OCCURRENCE DETECTOR FOR ERROR CHECKING AND CORRECTING SYSTEMS
Inventors: Gary D. Burns and Scott D. Schaber
Ser. No.: 464,184
Filed: Feb. 1, 1983 now U.S. Pat. No. 4,523,314

Title: MULTIPLE UNIT ADAPTER
Inventor: James H. Scheuneman
Ser. No.: 596,205
Filed: Apr. 2, 1984

Title: A PRIORITY REQUESTER ACCELERATOR
Inventors: John R. Trost and Daniel Zenk
Ser. No.: 530,285
Filed: Aug. 31, 1983

Title: PARTIAL DUPLEX OF PIPELINED STACK WITH DATA INTEGRITY CHECKING
Inventor: James H. Scheuneman, et al.
Ser. No.: 595,864
Filed: Apr. 2, 1984

Title: PIPELINED DATA STACK WITH ACCESS THROUGH-CHECKING
Inventor: James H. Scheuneman
Ser. No.: 596,131
Filed: Apr. 2, 1984

Title: MULTIPLE PORT MEMORY WITH PORT DECODE ERROR DETECTOR
Inventor: James H. Scheuneman
Ser. No.: 596,132
Filed: Apr. 2, 1984

Title: HIGH PERFORMANCE PIPELINED STACK WITH OVER-WRITE PROTECTION
Inventor: Wayne A. Michaelson
Ser. No.: 596,203
Filed: Apr. 2, 1984

Title: AN IMPROVED ACCESS LOCK APPARATUS FOR USE WITH A HIGH PERFORMANCE STORAGE UNIT OF A DIGITAL DATA PROCESSING SYSTEM
Inventors: Daniel K. Zenk and John R. Trost
Ser. No.: 596,202
Filed: Apr. 2, 1984

Title: MULTILEVEL PRIORITY SYSTEM
Inventors: James H. Scheuneman and W. A. Michaelson
Ser. No.: 596,206
Filed: Apr. 2, 1984

Title: PIPELINED SPLIT STACK WITH HIGH PERFORMANCE INTERLEAVED DECODE
Inventors: James H. Scheuneman and W. A. Michaelson
Ser. No.: 596,215
Filed: Apr. 2, 1984

All applications are assigned to common assignee Sperry Corporation, a corporation of the state of Delaware having a place of business at 1290 Avenue of the Americas, New York, N.Y. 10019.

CONTENTS

BACKGROUND OF THE INVENTION
 A. Field of the Invention
 B. Description of the Prior Art
SUMMARY OF THE INVENTION
BRIEF DESCRIPTION OF THE DRAWINGS
DESCRIPTION OF THE PREFERRED EMBODIMENT
 A. The Present Invention Resides in a High Performance Storage Unit (HPSU)
 B. The Problem Solved by the Present Invention
 C. General Description of the HPSU
 D. Detailed Description of the HPSU Block Diagram
 E. Timing of the HPSU Within Which the Circuit Apparatus of the Present Invention Resides
 F. The Circuit Apparatus of the Present Invention
 G. Timing Diagram of the Operation of the Present Invention

BACKGROUND OF THE INVENTION

A. Field of the Invention

The present invention generally concerns the management of a maintenance exerciser, being a logic entity which does administer a regimen of read and write testing to a selectable portion of the stores of a memory unit, when such maintenance exerciser is operative for testing a portion only of the memory stores of a memory unit, the remaining stores of such memory unit remaining on-line for service of normal, system, requestors of such memory unit. The present invention specifically concerns that the port which a memory unit presents to a maintenance exerciser, which maintenance exerciser is want to encounter problems in the testing of selected memory stores including the problem that such memory stores are non-responsive and do time-out to requests of such maintenance exerciser, experiencing a time-out to a request of a maintenance exerciser should be forced clear, thereby precluding that further requestors still on-line and operative with remaining memory stores of such memory unit should be time delay impacted in their access to such remaining stores of such memory unit.

B. Description of the Prior Art

The environment of the apparatus and method of the present invention is a very large scale, very high performance, digital computer memory unit such as is described in U.S. patent application Ser. No. 596,130. It is a known maintainability feature in the prior art for very large scale, very high performance, computer memory units that the memory stores of such units should be dynamically partitionable into those dedicated to applications and those upon which, the memory unit remaining on-line, operational validity checking and maintenance may be exercised. The utility of exercising maintenance—being the exercise and validity checking of logic, error correction/detection logic, and memory stores—upon part of the memory stores of a very large scale memory unit while such large scale memory unit is, in the areas of stores not being exercised for maintenance, elsewise devoted to applications operation, is that such maintenance may be often performed with minimum conflict to the system utilization of that system resource, the memory unit, which may be very expensive. The on-line maintenance exercise of parts of the stores of a very large scale memory unit also provides the maximum potential for the detection and isolation of intermittent fault phenomena within the logics of such memory units as well as within those stores of such units detached to on-line maintenance testing.

It is known in the prior art that the maintenance exerciser which administers the regimen of read, write, and partial write on-line testing to a portion of the stores of a high performance memory unit, which memory unit is elsewise involved in servicing systems applications with the other stores contained therein, may be either internal to such memory unit or external to such memory unit. In either case, however, there is usually an external agency to the memory which does both configure the memory for test (i.e., designate which of the memory stores are to be devoted to on-line memory test and which are to be devoted to systems applications) and shepherd the progress of such testing (if not actually administering same), obtaining the results thereof. In other words, even if a maintenance exerciser is internal to a very large scale memory unit, the fault detections of such maintenance exerciser needs be communicated to the computer system, and such computer system needs (if possible) reconfigure such high performance memory unit to operability, through an interface to such high performance memory unit. Such an interface is normally in the prior art a memory port fully capable of normal memory command, read, and write operation. The device connected to such an interface is normally called a maintenance processor, or a System Support Processor(SSP).

It is also known in the prior art that a particular error which a memory may exhibit to a requestor is called a time-out error. It is possible for a memory unit to become non-functional, and to time-out, to all requestors, such as upon the interruption of power to such memory unit. It is also possible for a memory unit to time-out to one(s) of the user-requestors of such memory unit, such as by failure of the interfaces to, or by failing to honor in priority requests from, such one(s) of user-requestors. Finally, if the memory unit is large and consists of a number of independently simultaneously operative memory stores, then the failure of selective one(s) of these independently operative memory stores may selectively result in the time-out of selective requests made thereto, such requests arising from any of the requestor-users with which the memory unit communicates with upon a number of ports. The time-out interval, after which a time-out error is registered, is usually much, much longer than the expected time within which the directed operation will transpire within the memory unit. Therefore, the time-out condition is an abnormal, or error, condition which represents that some requestor-user request(s) of a memory unit has (have) not been satisfactorily completed within an interval of time within which such should have been satisfactorily completed.

As indicated, the time-out error condition can arise from incipient malfunction, or prolonged delays resulting from reoccurring prioritized conflicts for access to the selfsame resource, within a memory unit. All time-out error conditions, wheresoever in the memory unit arising, are conceptually unified: the user-requestor of a memory unit does not see a response to its request within a desired interval. One of the functional logic areas of a memory unit from which, due either to incipient failure or to conflicts, a time-out error condition can result to a requestor-user is the priority functional logic area. If some condition occurs which stops successive prioritization in this functional logic area, certain one(s) of the requestor-users which register requests which are not timely honored may be timed-out. That (those) occurrence(s) which causes a priority functional logic section to cease to function (or cease to function adequately repeatedly quickly), causing a time-out to requestor-users, need not arise from incipient failure within such functional priority logic section itself. Consider, for example, a pipelined memory unit wherein the functional priority logic section is enabled to perform successive prioritization conditionally only upon the receipt of acknowledgment(s) of previous prioritizations. This (these) acknowledgment(s) can arise from next subsequent, successive, functional logic priority layers, or can arise from that resource being prioritized: the independently simultaneously operative memory stores. In either case the concept is simple: the priority function should not, and will not in a positive (acknowledged) control scheme, perform prioritization until, and unless, it is apprised (via acknowledgment(s)) of the operational availability of that shared resource the useage of which is being prioritized. Therefore, if some portion or portions of such shared resource is inoperative (i.e., not responding within a time-out error interval), and prioritization logic does not have the capability to prioritize across a reduced space of available resource (which non-dynamic adjustment of the prioritization space is most common), then the unavailability of some portion of that shared memory resource which is successive to the functional priority logics (whether such successive portions be further priority logics or memory stores or whatever) will normally have the effect of suspending further, cyclical, operation of the functional priority logics.

The fact that successive prioritization may become suspended, and the functionality of an entire memory unit may be suspended or negated to the requestor-users thereof such memory unit, is not always an unduely troublesome condition. It is known in the prior art that requestors of memory should be capable of going through recovery sequences, most often interrupt driven and software programmed, to account for resume, or time-out, errors occurring upon requests of memory units. Sometimes system memory resource partitionment will permit of the removal of an entire memory resource, and the entirety of memory stores contained therein, from system utilization upon the occurrence of any time-out error occurring upon the attempted utilization by any requestor of any part of the functionality of such memory unit. Suppose, however, that the memory unit is a very large scale computer memory unit with a multiplicity of independently functionally operative capacity, such as storage memory banks, therein. If only a portion or portions of this independently functionally operative capacity within a single memory unit is timing-out, it is a straightforward process for the time-out error recovery routine(s) within the requestors to shift further requests for memory operation only to the remaining correctly functional areas. If such were the end of the system response to the occurrence of time-out error upon certain portion(s) of a memory unit, it would present no problem that if requests were to be made to the inoperative portion(s) of such memory units, then the time-out error conditions resulting from such requests would significantly suspend, or obstruct normal functionality of the priority logics, even unto the point of conflicting with requests of requestor-users referencing remaining functional operability of such memory unit to the point that such requests would themselves, due to conflict in priority with the unsatisfied or unsatisfiable requests, be timed-out.

Reasonable numbers of error recovery sequences due to memory time-out taken at requestors of such memories, even those requestors which are correctly referencing (remaining) correctly functionally operative portions of such memory unit, are both countenanced and acceptable. But if there is some requestor of a memory—unit which memory unit is producing time-outs responsively to requests of certain portion(s) of its functionality—which requestor is making abundant and/or continuous requests to exactly such portions of the memory unit as are producing the time-out error conditions, then this requestor will, by the time-out conditions which it is causing, be significantly obstructing the response within the functional priority logic section of such memory unit to other requestors (which are requesting correctly operative functionality of such memory). That a requestor should be abundantly and repetitively requesting of such portions of a memory unit as are producing an error time-out condition is exactly the function of maintenance exerciser, which maintenance exerciser is employed to delimit and analyze the failure of portions of a memory unit while other portions may concurrently remain on-line for normal utilization by other system requestors. In the prior art, those conflicts and that disruption which the utilization of a maintenance processor upon failed portions of a memory unit producing the time-out error condition did cause was simply tolerated by other requestors, such requestors performing successive recoveries for those time-out conditions which they did, even though requesting correctly functionally operative portions of the memory unit functionality, regularly experienced due to conflict within the functional priority section thereof such memory unit with the maintenance exerciser and with those abundant time-out errors being caused by the request of such maintenance exerciser. The priority functional logic section of prior art memory units, even such very large scale high performance memory units as might be expected to be partitioned into operative and non-operative portions upon the failure of parts thereof, are ill-structured to account for efficiently servicing some requestors while another requestor, nominally a maintenance exerciser, does make continuing requests of such functional operability of the memory unit as is failed, producing a time-out error condition responsively to such requests.

SUMMARY OF THE INVENTION

The present invention deals with a modification to the priority logics of a memory unit, within which priority logics the competing requests from a plurality of requestors communicative through ports to such memory unit are prioritized for access to the shared resource of such memory unit, mainly a number of simultaneously independently operative memory stores, or banks. In the perferred embodiment of the invention, a nominal ten requestors of a nominal four types are prioritized up to four at a time for simultaneous, non-conflicting, reference of up to four memory banks of a nominal eight such independently simultaneously operative memory banks. The priority logic of the perferred embodiment happens to operate upon a snapshot priority scheme, and each subsequent initiation thereof is called a priority snap, although this particular priority scheme is not essential to the operation of the present invention. Of importance, however, is the concept that each successive priority snap, or each successive priority determination amongst competing requests from the multiplicity of requestors of a plurality of types, will not transpire until the total prioritized requests of a previous, prior, prioritization have been positively acknowledged, meaning that such are being acted upon. So far, the priority logics function completely normally by not engaging in a next subsequent prioritization priorly to the results of a current prioritization being accepted and acted upon.

Meanwhile, the priority logics to which the present invention is a modification do function so that if a request, duely prioritized, is made of a memory store, or bank, and such request is not positively acknowledged within a certain interval because such requested memory store is inoperative or malfunctioning, then successive prioritizations will not transpire, and all pending requests will not be prioritized, and will remain unserviced. The requestors communicative with the memory unit do sense after a period that their pending requests are not timely serviced, suffering thereby a condition known as a memory unit time-out. When the memory unit is very large and does contain a number (nominally 8) of independently operative memory stores, the response of requestors to such time-out condition, which response is normally controlled by software, is normally to relocate functional utilization of such memory unit to remaining operational portions thereof, making subsequent requests only to such portion or portions thereof as do not create of the error, time-out condition. Such an error time-out condition, and system response by the rebasing of requestor activity within a memory unit(s) exclusively within the remaining functional portion(s) thereof such unit(s), is also normal in the computer art.

The memory unit, to the priority logics of which the present invention provides a modification, is subject to the operation of a maintenance exerciser on a portion(s) of the stores thereof concurrently that normal requestors are operative on a remaining portion(s) thereof such memory unit. The maintenance exerciser, which may be either internal to or external of the memory unit, is but a circuit, or device, which makes requests (prioritized in a normal manner) for the reading and/or writing of the memory store in a conventional manner to which reading and writing does transpire responsively to the requests of normal requestor-users of the memory unit. The maintenance exerciser so exercises the memory unit to the end that such memory unit may be tested, and the correct functionality thereof determined. Whereas normal requestor-users of memory do seek to avoid the generation of requests resulting in a memory unit time-out condition, regarding such as an abnormal error occurrence, the maintenance exerciser, to the contrary, is often deeply involved in plumbing the entire extent and characteristics of the memory malfunction, and may be normally expected to make many requests in examination of inoperative or malfunctioning memory stores which requests (when prioritized and submitted to such malfunctioning memory stores) may fail to be acknowledged, resulting in the time-out condition. The function of concurrent maintenance performed by a maintenance exerciser is also known in the computer arts.

The modification and improvement of the present invention to the priority logics of a memory unit deal with reconciling the continuing functional performance, by at least part of the independently functional operative sections (storage memory banks) therein, to the normal requestor-users of such memory unit referencing only such correctly operational functional sections while a memory maintenance exerciser is concurrently requesting inoperative, or malfunctioning, remaining portions thereof such memory unit causing thereby such references the time-out condition which does preclude the priority circuit from successive prioritizations, and thus from efficient service to remaining requestor-users of the memory unit. The circuit of the present invention is therefore of greatest utility upon the conjunction of an extensive number of conditions: (1) a memory unit is communicative with a multiplicity of requestors, including a maintenance exerciser type requestor, for the reading and writing of the stores therein, (2) such stores therein are organized at a multiplicity of independently simultaneously operative storage memory banks, (3) the selection of a plurality of pending requests from such multiplicity of requestors for simultaneous application to a like plurality of such storage memory banks is accomplished within a priority network, (4) the priority network is released for successive prioritizations, allowing successive ones of the multiplicity of requestors to obtain access to the memory stores, upon, and only upon, that each of the storage memory banks referenced during a single prioritization does acknowledge of the prioritized request thereto, and does correctly act thereupon such request, (5) if a storage memory bank is not responding, then successive prioritizations will be precluded and all requestors of the memory unit will ultimately suffer a time-out, or error condition indicating non-responsiveness of the memory unit, of requests made thereto, (6) a memory exerciser may be enabled for concurrent maintenance on ones of the storage memory banks as are non-responsive, and as would normally result in a time-out of requests made thereto, simultaneously that others of the requestor-users of the memory unit do attempt to make normal reference to the remaining operative ones of the storage memory units. The improvement circuit of the present invention precludes that the non-responsiveness, or inoperability, of certain one(s) storage memory banks as are being referenced by a maintenance exerciser should lock up a priority network, resulting in a time-out of other requests made thereto which requests are validly made to remaining, correctly operative storage memory units.

The method and function of the improvement circuit of the present invention by which a forced clear may be obtained of a memory time-out to a maintenance exerciser is quite simple. Essentially, the lock-up of a memory priority circuit, which would resultant from any lack of acknowledgement (by an independently operative storage memory bank) of a prioritized request (to such storage memory bank) originating from one only type requestor (the maintenance exerciser) is precluded, or defeated, from happening. The circuit improvement so permitting of the defeat, or preclusion, of a time-out occurring from a maintenance exerciser request by acting to clear such pending time-out condition is a simple time delay circuit. The circuit is enabled to measure a fixed delay by the normal, duely prioritized, request of a maintenance exerciser to a storage memory bank. The time delay circuit is normally cleared, meaning reset, by the normal receipt of an acknowledgement from the referenced storage memory bank, which acknowledgement does enable, in a normal fashion, the priority circuitry to perform a next successive prioritization. In the abnormal event that an acknowledge is not returned from the maintenance exerciser reference storage memory bank, however, as could be the case when such storage memory bank is malfunctioning or nonfunctioning, the improvement delay circuit of the present invention will, after a fixed delay, serve to clear the pending requests of the maintenance exerciser within the priority circuit, enabling such priority circuit to perform successive prioritization identically as if the storage memory bank had operatively responded by acknowledging the maintenance exerciser request made thereto. This loosing of the priority network by the clearing, or defeat, of that condition which would normally result in a time-out to the maintenance exerciser, and additionally to other requestor-users with requests pending within such priority network, does have the adverse effect that a maintenance exerciser, being unable to lock-up a memory priority by the making of requests therethru to inoperative or malfunctioning storage memory banks, cannot itself experience a memory time-out. In other words, the improvement circuit of the present invention that does clear a memory time-out to a maintenance exerciser precludes that such maintenance exerciser should be capable of the recognition of a memory time-out fault condition. This is usually unimportant, however, because the time-out malfunction of the memory has normally already been recognized during system utilization, and the repeated encounter of such by a maintenance exerciser during concurrent maintenance upon dedicated storage memory banks is both nonproductive and unilluminating to the maintenance exerciser which is interested in sophisticated and repetitive examination of memory (in this instance in the area of the storage memory bank) functionality, and not just the simplistic fact that a fault resulting in a time-out has occurred.

Correspondingly, it is a first object of the present invention that a time-out, being a prolonged period within which next subsequent requests cannot be registered with a storage memory unit, should be precluded, or cleared, for the particular type requestor which is a maintenance exerciser performing concurrent maintenance upon ones of independently simultaneously operative storage memory banks within a memory unit concurrently that other requestor-users of such memory unit are requesting other ones of the storage memory banks therein.

It is a second object of the present invention that the clearing of a time-out condition to a maintenance exerciser performing concurrent maintenance upon ones of the storage memory banks of a memory unit should allow that other ones of the requestor-users of such memory unit should not be unduely delayed, amounting to experiencing time-outs, in their access to remaining, correctly functional, ones thereof such storage memory banks within a single memory unit.

BRIEF DESCRIPTION OF THE DRAWINGS

FIG. 1, consisting of FIG. 1a and FIG. 1b, shows a block diagram of the High Performance Storage Unit within which the present invention resides.

DESCRIPTION OF THE PREFERRED EMBODIMENT

Figure 2:
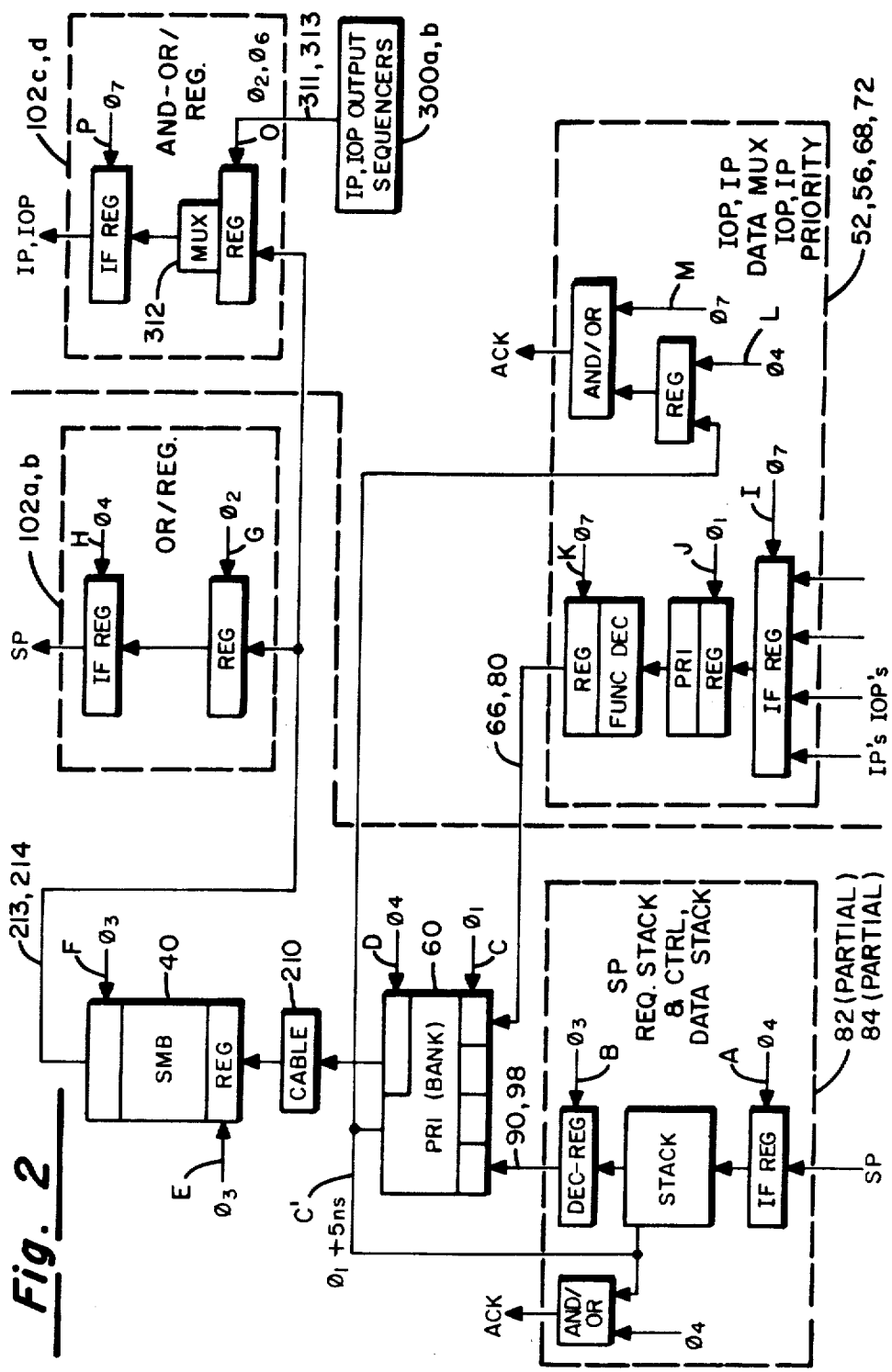
FIG. 2 shows a detailed block diagram of the timing of the HPSU in order that it may interface with requestors of two disparate interface communication cycle times.

A. The Present Invention Resides in a High Performance Storage Unit (HPSU)

The present invention resides in, and is utilized in the functional performance of, a High Performance Storage Unit (HPSU) which is the subject of U.S. patent application Ser. No. 596,310, the entire contents of which are incorporated herein by reference. For the sake of completeness, certain of the description of such an HPSU is herein provided.

The HPSU resides in a digital data processing system which is essentially modular, and provides for parallel processing. Normally, from one to four Instruction Processors (IP0 through IP3) will be interfaced to the HPSU. Each IP can, for example, be a Type 3054-00 unit available from Sperry Corporation, or such other Instruction Processor available commercially as would be compatible. The IP provides basic mode and extended mode instruction execution, virtual maching capability, and contains two buffer memories: one an operand buffer, and the other an instruction buffer. Each IP is functional to call instructions from memory, execute the instructions, and in general does data manipulation. The IP also executes instructions to set up input and output data buffers and channel access control. It is one of such IP's—specifically IP3—which is one of the two requestors which shares a single memory port with another requestor, actually internal to the HPSU but fully capable as if it were an IP, called a maintenance exerciser. The reason for, and manner of, prioritized sharing of a single memory port is taught in companion application Ser. No. 630,141, filed July 12, 1984, the contents of which are incorporated herein by reference. For the purposes of the present invention it is only necessary to realize that requestors of both the IP and maintenance exerciser types (as well as further types) to request the HPSU, and are prioritized in access thereto.

In conjunction with the IPs, from one to four Input/Output Processors (IOP0 through IOP3) are also normally interfaced to the HPSU. The interconnection between the HPSU and the IPs and the IOPs are in fact direct connections between each unit, and the interconnection is not bused. Each IOP can be a Type 3067-00 unit available from Sperry Corporation, or an equivalent type of processor. The IOPs handle all communications between the IPs, and the memory systems, and the peripheral subsystem. In this type of configuration, the IPs function as the system Central Processing Units, and the IOPs act as CPUs to handle all of the communications. The IPs and IOPs are commonly referred to as the 11CO/90 system.

From one to four High Performance Storage Units (HPSU0 through HPSU3) can be utilized in a system. Each HPSU is a free-standing unit with eight memory banks, each bank containing 524K storage data words. Error Correction Code (ECC) is used internal to each HPSU to provide single-bit error correction and double-bit error detection.

Each HPSU provides four Instruction Processor (IP) ports for providing communication paths to the IPs, both for reading and writing. Again it should be understood that inter-connection between each HPSU and each IP is directly cabled, and is not bused. Each HPSU also includes four Input/Output Processor (IOP) ports for interconnection with the IOPs. These interconnections are direct cables between each HPSU and each IOP. The IP and the IOP ports are each two-word read and write interfaces, where each word contains 36 data bits and is accompanied by four parity bits. The IOP and IP interfaces operate on a 60 nanosecond interface cycle time.

Each HPSU also includes at least one Scientific Processor (SP) port, and in the embodiment of this disclosure has two such SP ports. Each SP port has a four-word data interface. If a single SP is used with a single HPSU, it may be coupled directly to the SP port of such HPSU. When two or more HPSUs are used with an SP, it is necessary to provide a Multiple Unit Adapter (MUA) for each SP. Regardless of whether or not interfaced through a MUA, each SP interface reads or writes four words, where each word contains 36 data bits and is accompanied by four parity bits, upon each interface cycle time of 30 nanoseconds.

Each SP functions under direction of one or more of the IPs to perform scientific type calculations in a support mode. In this regard, the IPs can be considered to be host processors and the SPs can be considered to be support processors, all operating through the common storage of the HPSU(s).

The overall system maintenance and supervision is accomplished through one or two System Support Processors which are connected to all units of the system. The SSP is available commercially and is utilized in the Sperry Corporation 1100/90 Systems. In general, it is understood that each SSP performs the function of a hardware maintenance panel for the system. The display and setting of information, the activation at most maintenance facilities, selecting modes of operation and the like, is done at the control section of the SSP. The primary maintenance facility of the HPSU which is activated in order to obtain a test of the HPSU operational validity in reading, writing, and storing data is called the maintenance exerciser. Such maintenance exerciser is an internal logical capability of the HPSU, which capability may be implemented by a microprocessor executing firmware, to exercise the memory function. In the preferred embodiment of the invention it is this maintenance exerciser, which does make requests to read and write the memory stores equivalently as if it were a normal requestor and most specifically an IP type requestor, which does, with IP3, share a single memory port under modified snapshot priority. The existence of an HPSU-internal maintenance exerciser needs not be specified for the utilization of the present invention. Indeed, an external SSP, which is an entire computer and which may be specified to be an IP-type or IP-equivalent computer, may directly perform the detailed test and exercise regimen which is suggested, in the preferred embodiment of the invention, to be better performed by specialized test logic within the HPSU. Indeed, the present invention will serve to allow that any ported requestor, whether internal or external, acting as a maintenance exerciser of the HPSU memory will, by the action of a circuit uniquely associated only with the port of such maintenance exerciser, be forced clear of any memory time-out to such maintenance exerciser. Such forced clear, allowing the prioritization logics to continue subsequent, further, prioritizations of requests from all requestors (including the maintenance exerciser) of the HPSU will have the dual effect that the maintenance exerciser will not experience a time-out (being a prolonged interval during which the HPSU is unresponsive to honor the current and next subsequent requests) to the HPSU memory and, more importantly, other requestors of the HPSU will be enabled to have their requests prioritized in the continuing operative prioritization logics, such other requests presumably being to remaining correctly operative, not timing-out, portions (called storage memory banks) of the memory stores of such HPSU.

Continuing in the description of the HPSU within which the present invention resides, a clock system is utilized to maintain synchronous operation of the entire system. Clock and synchronizing signals are sent to each IP as well as each HPSU, each IOP, and each SP. The clock interface includes signals and commands from the IP for controlling clock rates, clock mode, cycle count, and other capabilities of the clock.

Intercommunication between units is essentially on a Request and Acknowledge basis, and the interfaces will be described in more detail as appropriate.

B. The Problem Solved by the Present Invention

In the prior art no port existed to any of a multiplicity of requestors, including a maintenance-exerciser-type requestor, of a large-scale high-performance storage memory unit containing a multiplicity of independently simultaneously operative storage memory banks which port, should a duely prioritized request thereon make reference to a storage memory bank which was (due to being in a faulted condition) non-responding, would not suffer a time-out fault condition, meaning a prolonged period of time within which the storage memory unit would not honor next subsequent requests from that port which did make request to the non-responding storage memory bank, nor would next subsequent requests from any port be honored. Why was it necessary that no next subsequent requests from any port, including presumably at least some next subsequent requests to correctly operative storage memory banks, should be honored while a time-out fault condition exists responsively to one request? It was because the entire system of requestors to a storage memory unit is normally best apprised of the non-communication difficulties of any requestor thereof such memory unit, and if some requestors be left running in the storage memory unit (at least until such blunder into inoperative memory stores thereof such storage memory unit) while other requestors are stopped, or timing-out in requests of memory, then the system is liable to become hopelessly tangled. The prioritization logic is that point from which a plurality of prioritized requests, prioritized of a multiplicity of such pending requests derived from a like multiplicity of ports, are applied to a like plurality of then-available independently simultaneously operative storage memory banks. Those requested storage memory banks which are correctly operative acknowledge the requests thereto. The receipt of acknowledgements from each of all requested storage memory banks enables a next subsequent prioritization of then-pending requests.

The present invention is of utility when (1) a requested storage memory bank is inoperative and not acknowledging requests thereto, (2) only a requestor, to be called a maintenance exerciser, which is knowledgeable of such inoperability and can countenance continuing to request of storage memory banks exhibiting such inoperativeness without being constantly (re)informed of such inoperativeness through a time-out fault condition does reference such inoperative storage memory banks, while (3) concurrently to the maintenance-related references of such maintenance exerciser normal requestor-users of the storage memory unit do make continuing requests only to the (remaining) operative storage memory banks therein. The circuit of the present invention acts to improve normal priority logics in order that the non-acknowledgment of a storage memory bank(s), which non-acknowledgment will normally result in a memory time-out condition to the requestor(s) which made the unservicable request(s), will, exclusively to request(s) of such inoperative storage memory bank(s) arising from one maintenance exerciser not result in a time-out condition. Instead, the priority logics will be enabled to continue prioritizations of pending requests. When the inoperative storage memory bank(s) are dealt with exclusively by the maintenance exerciser, while the continuing requests of remaining requestor-users of the storage memory unit are directed exclusively to (remaining) operative storage memory banks, then the improvement circuit of the present invention allows of concurrent maintenance upon a multi-ported, prioritized storage memory unit containing a multiplicity of independently operative storage memory banks even when one(s) of such storage memory banks is inoperative and will not acknowledge requests thereto.

C. General Description of the HPSU

Before commencing with the detailed description of the present invention within sections F. and G., it is desirable to understand the HPSU within which the present invention resides which is generally described in the present section C. and particularly described in the following section D., and the timing of which is described in fillowing section E. If the routineer in the digital computer memory art who is familiar with the prioritization, and snapshot prioritization, of competing ported requests to read and write a jointly shared memory store does not wish to assimilate all the information in sections C., D., and E. in understanding the present invention, then the following absolute minimum teaching should be noted. First, the snapshot priority to which the circuit apparatus of the present invention constitutes an improvement is shown as IP PRIORITY 68 in FIG. 1b. The maintenance exerciser (not shown in FIG. 1) shares a single prioritized memory port with IP3, requests from which IP3 are received as signal IP3 REQ on cable 203a shown in FIG. 1b. Second, the second level priority network within the HPSU, called BANK 0 PRIORITY 60a through BANK 7 PRIORITY 60h (shown in FIG. 1b) does acknowledge the first level priority, e.g., IP PRIORITY 68, that a first-level-prioritized request is accepted and is being honored and is being acted upon by signal C' shown in FIG. 2, which signal may be observed to be distributed from PRI (BANK) 60 to IOP, IP DATA MUX IOP, IP PRIORITY 52 56, 68, 72 which includes IP PRIORITY 68. For the purposes of basic understanding of the teaching of the present invention, it needs be known that the snapshot priority network, to which the circuit of the present invention is an improvement, does receive requests such as those from IP3 and/or from the maintenance exerciser, and is (internally to the HPSU) acknowledged of the successive prioritization of such requests by a deeper level within the HPSU, this deeper level acting via signal C'. In other words, the priority logics are activated by the receipt of IP and/or maintenance exerciser request(s), act to prioritize such requests (the IP3 request before the maintenance exerciser request), and are released from completing each such successive request prioritization by, and only by, an internal acknowledgement signal from a deeper logic level, which internal acknowledgement signal essentially says "your (prioritized) request is received, accepted, and is being acted upon". Third and finally, the circuit of the present invention is timed by an 8 phase clock appearing as 8φ CLOCK at the top of the timing diagram in FIG. 3. The occurrence of IP and/or maintenance exerciser request(s) shown as signal I in such FIG. 3, and the acknowledgement via signal C' (also shown in FIG. 3) to successive prioritized requests, do provide the timing framework within which the circuit of the present invention does operate. Signals I and C' will later be seen in FIG. 4.

Continuing now with the complete and entire general description of the HPSU within which the present invention resides, a block diagram of such HPSU is shown in FIG. 1, consisting of FIG. 1a and FIG. 1b. The HPSU is a storage device that is commonly accessible by the IPs, the IOPs, and the SPs via the MUAs. The various devices that can be coupled to the HPSU can have differing bit-widths of interface data transfer, and differing interface cycle times.

In the preferred embodiment, the HPSU utilizes eight Banks of storage devices, identified as STORAGE MEMORY BANK 0 40a through STORAGE MEMORY BANK 7 40h of which Banks 0 and 7 are illustrated. Though not specifically illustrated in FIG. 1, each storage memory Bank is comprised of four Memory Modules and each Bank has a total capacity of 524K storage data words. Such a word in memory is 36 data bits, and is accompanied by 8 bits which are utilized for Error Correction Code (ECC) check bits, and for parity bits. Each storage memory bank is arranged for receiving four words (W1, W2, W3, and W4), and for reading out four words upon each read/write cycle time.

The STORAGE MEMORY BANKS 40a through 40h include the addressing circuitry, the storage cells, the timing circuits, and the driver circuits, and can be constructed from commercially available components, it being understood that the accessing rate (read/write cycle time) must accomodate the interface rates (interface cycle times) with the attached units.

The wide lines indicate directions of data flow, and the single lines indicate control flow.

At the input, the HPSU has an IOP interface 202 which can accommodate up to four IOP units at the four IOP ports labelled IOP0 through IOP3. It also has an IP interface 203 which can accommodate up to four IPs at the four IP ports designated IP0 through IP3. The IOP ports 202 and the IP ports 203 each operate to receive two data words (if a write is directed) plus address, function, and start/end data using an interface clock cycle time of 60 nanoseconds.

The HPSU also has two input SP interfaces 200 and 201 which can accommodate two SPs at the two ports labelled SP0 and SP1. The SP input ports each function to receive four data words (if a Write is directed) plus address and function data upon each interface cycle time of 30 nanoseconds.

The request and control signals from the IOP ports 202 are passed to the IOP PRIORITY 52, which functions to select the particular IOP to be given priority of access to the memory system. The selection is passed on line 54 to the IOP DATA MUX 56 which functions to select the appropriate data and address information to pass on line 58 to the BANK MULTIPLEXER 60i. The control signals provided on control path 62 drive the REQ DECODER 64 for selecting one-of-eight control lines 66 for providing control signals for making storage memory bank selection.

In a similar manner, the IP ports 203a provide request signals to the IP PRIORITY 68, which provides control signals on control line 70 to the IP DATA MUX/STACK 72 for selecting the data and address signals that will be provided on path 74. Similarly, the control signals on lines 76 to the REQ DECODER 78 results in signals being provided to select one of eight lines 80 for controlling storage memory bank selection.

The two SP ports 200 and 201 are each arranged to store requests in REQ. STACK & CTRL 82, and in REQ. STACK & CTRL 84. Additionally to SP requests, SP data and address and function are temporarily held in SP0 DATA STACK 82 for SP1 DATA STACK 84 awaiting availability of the memory system. In essence, the SP0 stacks and the SP1 stacks are each a first-in-first-out (FIFO) circulating buffer. The request information feeds out of REQ. STACK & CTRL 82 on line 86 to the REQ. DECODER & SELECTOR 206 which provides a one-of-eight selection while data and address and function pass on line 204 to DATA SE- LECTOR 208 and then to BANK MULTIPLEXER 60i. Similarly, request information passes on line 94 from REQ. STACK & CTRL 84 to REQ. DECODER & SELECTOR 207 for making selections on lines 98, while the data and address and function passes on line 205 to DATA SELECTOR 209 and then to BANK MULTIPLEXER 60i.

The BANK 0 PRIORITY 60a through BANK 7 PRIORITY 60h each function to select between the IOP, IP, and the two SP requests presented to each for accessing memory. Each also functions to control the associated storage memory bank, STORAGE MEMORY BANK 0 40a through STORAGE MEMORY BANK 7 40h, to cycle and also to emplace data read upon one of the four storage memory output ports SP0, SP1, IOP, and IP of such storage memory banks, which storage memory output ports are respectively connected to SP0 wired-OR communication buses 213, to an SP1 bus (not fully shown) like buses 213, to an IOP bus (not fully shown) like buses 214, and to IP wired-OR communication buses 214.

The HPSU as an IOP output AND-OR/REG. 102c capable of handling the IOP memory resource port connection to four IOPs: IOP0 through IOP3. It also has an IP output AND-OR-STACK/REG. 102d capable of handling IP the memory resource port connection to four IPs labelled IP0 through IP3. Finally, it has SP output OR/REG. 102a and OR/REG. capable of handling the respective two SP memory resorce output ports labelled SP0 and SP1. Data rates and timing at the output ports 224, 225, 226, and 227 are commensurate to those for the corresponding memory resource input ports previously described.

Each HPSU is assigned an address range of 4M 36-bit words. Each STORAGE MEMORY BANK 40a through 40h contains 512K words, and there are eight such banks within an HPSU. A bank is four words wide. Each bank operates independently of the other bank(s). Each receives request and output multiplexing control through the associated bank priority via a respective one of cables 210a though 210h, while receiving function plus start/end control (utilized in partial word operations) from the BANK MULTIPLEXER 60i via the respective one of cables 212a through 212h. Each receives data and address information from the BANK MULTIPLEXER 60i also via the respective one of cables 212a through 212h.

There are four storage memory output ports for each storage memory bank, consisting of one IOP, one IP, and two SPs, (SP0 and SP1) output ports. All data read to any of the IOPs (0-3) is transmitted through the storage memory IOP port, and all data read to any of the IPs is transmitted through the single storage memory IP port at each storage memory bank.

That wired-OR communication bus 214, for example, does carry the data read to the IP memory resource output port and thence to any of the four IPs (IP0 and IP3) requires that the output register/drivers of such memory resource port, AND-OR-STACK/REG. 102d, should be able to logically multiplex the read data received on bus 214 to an appropriate one IP. The AND-OR-STACK/REG. is controlled to do so by address signals (path not shown) received from the IP DATA MUX/STACK 72 and by priority port code signals (path not shown) received from IP PRIORITY 68. Likewise, the IOP memory resource port output register/drivers is controlled to logically multiplex data received upon a wired-OR communication bus to an appropriate destination IOP0 through IOP3 by signals received from IOP DATA MUX 56 and IOP PRIORITY 52 (paths not shown).

The HPSU provides a Dayclock, auto recovery timer, System Status register, maintenance exerciser, and an MCI interface. Odd parity is checked/generated across all interfaces for the IP's, IOP's, and SP's.

The function of the HPSU, including in the performance of the present invention, is discussed in greater detail in the next following section D.

D. Detailed Description of the HPSU Block Diagram

The block diagram of the present invention of a High Performance Storage Unit (HPSU) is shown in FIG. 1, consisting of FIG. 1a and FIG. 1b. The HPSU supports input and output interfaces to and from ten requestors: from and to Scientific Processor 0 (SP0) respectively across cables 200 and 224, from and to Scientific Procressor 1 (SP1) respectively across cables 201 and 225, from and to four Input Output Processors (IOP 0-IOP 3) respectively across cables 202 and 226, and from and to four Instruction Processors (IP0-IP3) respectively across cables 203 and 227. The HPSU contains eight storage memory banks, STORAGE MEMORY BANK 0 40a through STORAGE MEMORY BANK 7 40h, each containing 512K words for a total of 4M 36-bits words of memory storage. Remaining parts of the HPSU shown in FIG. 1 are the data and control paths, and the logic structure, which does support of the interface of the ten requestors to the eight storage memory banks.

Considering first the data interfaces to the Scientific Processors—the data input from SP0 via cable 200b and output to SP0 via cable 224 plus the data input from SP1 via cable 200b and output to SP1 via cable 225—such interfaces are uniformly four data words in width. Such four data words are transferable, bank priority conflicts and pending requests permitting, at an interface cycle time of 30 nanoseconds. Additionally received upon cables 200b and 201b, respectively from SP0 and SP1, is addressing and function information. There are 144 data lines in cables 200b and 201b plus 16 accompanying parity bits. There are also 6 function/write enable lines plus accompanying 1 parity bit. These 6 lines consist of 2 lines (2 bits) for function and 4 lines (4 bits) for the master word write enables (corresponding to the 4 words) plus 1 accompanying parity line (bit). There are also 22 address lines (allowing addressing at four-word boundaries within the collective storage memory banks, STORAGE MEMORY BANK 0 40a through STORAGE MEMORY BANK 7 40h. The requests of the HPSU by respective SP0 and SP1 is carried on respective interface communication lines 200a and 201a. The output cables 224 225 carry four words or 144 bits of read data, plus 16 parity bits.

Continuing in FIG. 1 with the interfaces to the HPSU, the HPSU supports of four "data" interfaces from and to four IOP's, IOP0 through IOP3, on respective cables 202b and 226. The interface to each IOP is two 36-bit words in width. Such two words may be transferred to such IOP's collectively at rates as fast as two words each 120 nanoseconds, and to an individual IOP at a rate of two words per 300 nanoseconds. Such slower rate to an individual IOP exists because of communication times across the interface. There are 72 data lines plus 8 accompanying parity lines in each of the cables 202b as receive communication from each IOP. There are additionally 24 address lines plus an accompanying 4 parity lines within the cables 202b communication path from each IOP. The greater number of address lines (24) upon the IOP ports than upon the SP ports (22) allows of addressing at the word boundaries within the collective storage memory banks. Finally, each IOP interface upon cables 202b carries 5 function lines plus an accompanying 1 parity line, and 12 lines carrying the start/end bits plus an accompanying 2 parity lines. The request signals from each of up to four IOP's are received via a dedicated line for each upon cable 202a. Each of the output cables 226 to each of the four IOP's carries 72 bits of read data, plus an accompanying 8 parity bits, on 80 total lines.

Likewise to the interface to the IOP's, the HPSU block diagrammed in FIG. 1 supports of an interface to four Instruction Processors, or IP's: the receipt of data and address and function and start/end information from the IP's which transpires on cable 203b, the receipt of requests from the IP's which transpires on cable 203a, and the issuance of data to the IP's which transpires via cable 227 The width of each data transfer is two words. The rate of data transfer may be as great as eight words per 240 nanoseconds for the IP's collectively during the block read operation thereto. For normal, non-blocked, read, the data transfer rate is identical to the IOP's at two words per 120 nanoseconds collectively. Again, the maximum data transfer rate to a single IP is two words per 300 nanoseconds, the lesser rate being due to the fact that multiple requests are not stacked (as will be seen to be the case for the SP's) and the interfacing time required to transmit an acknowledge from the HPSU to an IP, to process such within an IP, and to transmit a subsequent request to the HPSU. The number of signal lines and accompanying parity lines, within those cables 203a, 203b, and 227 of interface to the four IP's are identical to the numbers of lines within those corresponding cables 202a, 202b, and 226 of interface to the IOP's. In summary, there exists two SP ports each with a width of four data words, four IOP ports each with a width of two data words, and four IP ports each with a width of two data words in data communication between requestors and the HPSU.

Continuing in FIG. 1 with the explanation of the communication path to a Scientific Processor (SP), the data received upon such SP port is stacked in a 9-deep stack, the SP0 DATA STACK 82 or SP1 DATA STACK 84. Within these 9 locations for stacking data to be written within the HPSU, up to 8 may be filled at any one time with the remaining, 9th, left open. The ninth location is left open to augment performance in accordance with the teaching of U.S. patent application Ser. No. 596,203. Stacking of functions and addresses is also done on the Scientific Processor ports, such stacking as is additionally done in the structures labelled SP0 DATA STACK 82 and SP1 DATA STACK 84. The stacking of functions is in the 9-deep arrangement, but the address stack actually consists of two 4-deep address stacks without a ninth location. Such address stack, as well as the data and function stack, are controlled by the pending requests respectively held eight deep in REQ STACK & CTRL 82 and REQ STACK & CTRL 84 for the respective SP0 and SP1 ports. The splitting of the address stack into two 4deep halves is made so that the decoding of the address of a next uppermost pending request may be made before an acknowledge is received for that current request which is outstanding, i.e., which has been issued to the memory banks for service thereupon. The mode and manner by which requests, addresses, and data may be stacked in a pipeline in order to expedite the communication thereof from a requestor SP to the HPSU is contained within the aforementioned U.S. patent application Ser. No. 596,203 filed Apr. 2, 1984, for a HIGH PERFORMANCE PIPELINED STACK WITH OVERWRITE PROTECTION to Michaelson, the contents of which are incorporated herein by reference.

Continuing in FIG. 1, and recalling that the up to eight addresses as are stored in each of SP0 DATA STACK 82 and SP1 DATA STACK 84 are split into two half-stacks, called the odd stack and the even stack, so that a performance increase may be registered with the advance translation of such addresses immediately upon the issuance of an acknowledge, such addresses are passed by twos, one address associated with odd stack and called the odd address (although this means nothing as regards the actual location within the storage memory banks to be addressed) and another address associated with the even stack and called the even address, across cables 204 from SP0 Data Stack 82 to REQ DECODER & SELECTOR 206 in the case of SP0 interface, or across the two halves of cable 205 between SP1 DATA STACK 84 and REQ DECODER & SELECTOR 207 in the case of the SP1 interface. The stacked requests of REQ STACK & CTRL 82 for the SP0 interface are also received at the REQ DECODER & SELECTOR 206 via line 86, while the stacked requests of REQ STACK & CTRL 84 for the SP1 interface are received at REQ DECODER & SELECTOR 207 via line 94. The actual address bits received at the REQ DECODER & SELECTORS 206, 207 are four in number: address bits 2, 19, 20, 21 of which bits 2, 20, and 21 are utilized for four-bank interleave and of which bits 19, 20, and 21 are utilized for eight-bank interleave. Specifically, those address bits 2, 20, and 21 (or 19, 20 and 21) as are involved in bank selection do allow that the REQ DECODER & SELECTOR 206, 207 do, responsively to a received request, decode one of the selected bank priorities, BANK 0 PRIORITY 60a through BANK 7 PRIORITY 60h, furthering the request only to the one selected bank priority. Immediately upon the decoding and the sending of such request to one of the eight bank priorities, BANK 0 PRIORITY 60a through BANK 7 PRIORITY 60h, another request, and another address, are respectively received from the REQ STACK & CTRL and from the DATA STACK 82, 84 via respective cables 86, 94 and 204, 205 into the REQ DECODER & SELECTOR 206, 207, wherein such next subsequent requests and addresses are immediately decoded prior to the receipt of an acknowledge that the memory banks should have completed the previous request. Upon receipt of a bank acknowledge (path not shown) from the bank priority selection (as uppermost in priority) of the first-issued request, then the REQ DECODER & SELECTORs 206, 207 will issue this second, already decoded request. All stacked requests, and the decode thereof in the REQ DECODER & SELECTOR 206, 207, is on a first-in, first-out basis. The return acknowledge signal from the bank priority, BANK 0 PRIORITY 60a through BANK 7 PRIORITY 60h, to the REQ DECODER & SELECTOR 206, 207, and additionally to REQ DECODER 64, 78, is not shown in the block diagram of FIG. 1.

Continuing in FIG. 1, in a like manner by which four bits of the address were passed from DATA STACK 82, 84 via cables 204, 205 to REQ DECODER & SELECTOR 206, 207, a remaining 18 address bits, 144 data bits, and 6 function bits (+parity) are passed from DATA STACK 82, 84 via cables 204, 205 to DATA SELECTOR 208, 209. Each of two paths of width 161 bits plus parity within each of cables 204, 205 supports that the data, and the remaining bits of address, associated with a next subsequent requested memory location should become lodged within DATA SELECTOR 208, 209, even prior to the receipt of an acknowledge from the bank priorities, BANK 0 PRIORITY 60a through BANK 7 PRIORITY 60h, which indicates that the memory has acted upon a previous request (path of such return acknowledge not shown in FIG. 1). Similarly to the dual paths between each SP0 DATA STACK 82 and REQ DECODER & SELECTOR 206, and between SP1 DATA STACK 84 and REQ DECODER & SELECTOR 207, the dual paths between SP0 DATA STACK 82 and DATA SELECTOR 208, and between SP1 DATA STACK 84 and DATA SELECTOR 209, support of improved performance due to time-overlap. The DATA SELECTORs 208, 209 do supply via respective cables 92, 100, both 144 bits od data, a (remaining) 18 bits of addressing, and 6 bits of function (plus parity) to the respective SP0, SP1 ports of BANK MULTIPLEXER 60i.

Continuing in FIG. 1, two-word-width interfaces are accorded to each of four input output processors, IOP0 through IOP3, and like two-word-width-interfaces are accorded to each of four Instruction Processors, IP0 through IP3. Upon such interface up to four requests simultaneously arising undergo selection in a first level priority. Requests from IOP0 through IOP3 respectively received as signals IOP0 REQ through IOP3 REQ on cable 202a are selected amongst in IOP PRIORITY 52 to produce a single, highest priority one, request output on line 62. Responsively also to said first-level-priority selected one request, the IOP PRIORITY 52 controls via two multiplexed selection lines 54 the IOP DATA MUX 56 to select amongst data, address, function, and start/end field information received as signals IOP0 ADRS-DATA-FUNC-S/E through IOP3 ADRS-DATA-FUNC-S/E on cable 202b. In a like manner, first-level IP priority 68 does select amongst signals IP0 REQ through IP3 REQ on cable 203a to pass a highest priority one such request via line 76 to REQ DECODER 78. Simultaneously, such IP PRIORITY 68 will control via two multiplexed selection lines 70 the IP DATA MUX/STACK 72 to select amonst the data, address, function and start/end field information received upon four channels as signals IP0 ADRS-DATA-FUNC-S/E through IP3 ADRS-DATAFUNC-S/E on cable 203b. The IP DATA MUX/STACK 72 is to be distinguished from the IOP DATA MUX 56 for incorporating a stack capability in the enablement of the block write function, essentially the receipt of write requests to two consecutive addresses. The stacking of two such addresses in enablement of a block write should not be confused with the 8-deep stacking of requests as occurred upon the SP0 and SP1 channel interfaces. The block write function enables firstly that two words plus two words should be sequentially received upon the interface to an IP performing the block write function and that such will be combined into 4 words transferred at one time to DATA MULTIPLEXER 60i and thence to be written in memory "x", and secondly that another two words plus two words are sequentially received, combined, and written in memory "x+1".

Continuing if FIG. 1, the first-level prioritization of the four IOP ports and the four IP ports in respective IOP PRIORITY 52 and IP PRIORITY 68 is received via respective lines 62, 76 at respective REQ DECODER 64, 78 along with four bits of address via respective cables 58, 74. From three of such address bits as do provide for bank selection (bits 2, 20, and 21 or bits 19, 20, and 21), each REQ DECODER 64, 78 does activate (only) one request line of respective cables 66, 80, which one active request line is received at one of the eight bank priorities, BANK 0 PRIORITY 60a through BANK 7 PRIORITY 60h. If two data words, which is the nominal number, are associated with such IOP or IP write requests, then such two data words are emplaced in both the upper two words (word 0 and word 1) and the lower two words (word 2 and word 3) of a four-word field by respective IOP DATA MUX 56 or IP DATA MUX/STACK 72, with the resultant four-word field emplaced on respective cables 58, 74 for transmission to the respective IOP and IP ports of BANK MULTIPLEXER 60i. As will be latter seen, communication with the memory stores is at the 4-word-width level being that four words are contained one each within four parallely operative storage modules within each memory bank. Therefore, the alignment of two words within a four-word field is performed immediately at the IOP DATA MUX 56 (in the case of IOP communication) or at the IP DATA MUX/STACK 72 (in the case of IP communication), each memory bank being later controlled in the four storage modules contained therein to selectively write only the upper, or the lower, two words, as the case may be. In a like manner, it is possible for an IOP or an IP to command the writing of but a single word at any location, word 0 through word 3, within the 4-word boundary. Again, the single word will be properly positioned within the word 0 through word 3 location of a 4-word block by the IOP DATA MUX 56 or the IP DATA MUX/STACK 72. It is the selection control which will later be applied to the storage memory banks which will cause only the appropriate word to be written. Finally, it is possible during a block write operation such as is exercised only by the IP that the IP DATA MUX/STACK 72 should receive, responsively to the block write function code, two successive two-word transmissions of data from an IP, combining both such successive transmissions to be one (word 0 through word 3) four-word block which is emplaced on cable 74 for communication to BANK MULTIPLEXOR 60i. It should thusly be noted that although the interface to the IOP and to the IP is at a granularity of two words per communication cycle, both cable 58 and cable 74 are four words in width.

Continuing in FIG. 1, it is thusly to be noted that the second-level, or bank, priority in the elements of BANK 0 PRIORITY 60a through BANK 7 PRIORITY 60h does each receive a maximum of four requests to prioritize, which requests are resultant from the SP0 interface via cable 90, from the SP1 interface via cable 98, from the IOP interface via cable 66, and/or from the IP interface via cable 80. Each of the bank priorities, BANK 0 PRIORITY 60a through BANK 7 PRIORITY 60h, does prioritize the four requests received to communicate one such request—IOP requests being of higher priority than IP requests being of higher priority than SP0 requests being of higher priority than SP1 requests—to the associated storage memory bank, respective STORAGE MEMORY BANK 0 40a through BANK 7 40h. Communicated on cables 210a through 210h respectively connecting BANK 0 PRIORITY 60a to STORAGE MEMORY BANK 0 40a through BANK 7 priority 60h to BANK 7 40h are four word addressing enabling signals which do enable the respective four storage modules within each memory bank for the selection of all four words (word 0 through word 3), the upper two words (word 0 and word 1), the lower two words (word 2 and word 3), or a single word (word 0 or word 1 or word 2 or word 3) to be written within the respective four storage modules of each memory bank. This word addressing enablement is derived from the least significant two bits, bit 22 and bit 23, of those five bits of addressing information initially received at REQ DECODER & SELECTOR 206, 207 or REQ DECODER 64, 78. Thus by addressing proceeding from the request decoders and the bank priority are individual words (of four such) selected within each of the memory banks (eight such).

The bank priorities, BANK 0 PRIORITY 60a through BANK 7 PRIORITY 60h, just discussed as receiving request signals plus two bits of addressing information also perform a pretranslation of the function codes which direct the ultimate full and partial word reads and writes, and the test-and-set and test-and-clear functions, of the storage memory banks, STORAGE MEMORY BANK 0 40a through STORAGE MEMORY BANK 7 40h. Such pre-translation transforms the 5-bit function code (plus associated parity) from IP or IOP ports or the 6-bit function code (plus associated parity) from an SP port which is associated with the request now prioritized, plus the start and end fields each of 6 bits (plus associated parity) associated with such functions upon the IP or IOP ports, into a uniform format. Now the storage memory banks could be charged with directly receiving, translating, and acting upon the entire functions which deal with such storage memory banks (i.e., excluding functions dealing with the dayclock, system status register, error function register, etc.). The simple functions that the storage memory modules perform are well known in the art and beyond the teaching of this application. All necessary function code and start/end fields for the accomplishment of such functions could be specified to be routed only along with data and address from the various ports and through the BANK MULTIPLEXER 60i to the storage memory banks. However, the apparatus of the present invention saves a small amount of time in each exercise of a storage memory module by doing some of that function translation which might normally be associated with such modules within the bank priorities, BANK 0 PRIORITY 60a through BANK 7 PRIORITY 60h. Thus the bank priorities might have been called bank priority and control. The path by which the bank priorities, BANK 0 PRIORITY 60a through BANK 7 PRIORITY 60h, do receive 5 or 6 bits of function code (plus associated parity bit) and 12 bits of start/end fields is not shown in FIG. 1, although, as could be imagined, such a path is substantially identical to that proceeding through REQ DECODERs 206, 207, 64, and 78 via respective cables 90, 98, 66, and 80 to BANK 0 PRIORITY 60a through BANK 7 PRIORITY 60h. Similarily, the lines of control which proceed from BANK 0 PRIORITY 60a through BANK 7 PRIORITY 60h to respective STORAGE MEMORY BANK 0 40a through STORAGE MEMORY BANK 7 40h are not specifically shown in FIG. 1, although these lines are parallel to cables 210a through 210h.

Again, that a pre-translation function has been moved outside the storage memory banks to be accomplished upon an earlier stage in the pipeline is purely a design decision of significance only in that a routineer in the art of digital memory design should be attentive to such an option in the creation of well balanced pipeline stages in the implementation of a very high performance memory.

Considering the prioritization function discussed within the second preceding paragraph, it is to be noted that the bank priorities, BANK 0 PRIORITY 60a through BANK 7 PRIORITY 60h, do receive of but four request inputs because four IOP ports have been previously prioritized into one signal by IOP PRIORITY 52 while four IP ports have been previously prioritized into one signal by IP PRIORITY 68. The number of requests which are prioritized by a priority network positively correlates with the required operational time of such a network. In other words, the time needed to decode a 1 of N priority increases as N increases. Consequently, that the bank priorities need prioritize only four requests allows such to operate faster than if such were to prioritize amongst the total ten ports (two SP's, four IOP's, and four IP's) upon which the HPSU communicates. Furthermore, it is to be noted that requests arising from the SP's are directly routed to the bank priorities, with only the competing requests of the IOP's and of the IP's going through a first-level priority determination. Consequently, the priority scheme of the present HPSU may be considered a 2-level priority scheme, the purpose of which is to optimize performance to two SP requestor ports, while simultaneously supporting access by a large number of additional requestors (four+four) on two ports. Further function of the 2-level priority determination of the present invention is described in U.S. patent application Ser. No. 596,206 for MULTI-LEVEL PRIORITY SYSTEM to Scheuneman, et al., the contents of which are incorporated herein by reference.

Continuing in FIG. 1, the BANK MULTIPLEXOR 60i receives four words of data plus 17 bits of address (plus parity) upon each of four portals: those to SP0, SP1, IOP, and IP. The four words of data received on each portal is directed to a storage memory bank, STORAGE MEMORY BANK 0 40a through STORAGE MEMORY BANK 7 40h, under the multiplex selection control respectively received from BANK 0 PRIORITY 60a through BANK 7 PRIORITY 60h on respective cables 211a through 211h. Such data will be written (in the case of a write function) into the storage memory banks, STORAGE MEMORY BANK 0 40a through STORAGE MEMORY BANK 7 40h, by four words, or by two words, or by single word under the control of word selection received from respective BANK 0 PRIORITY 60a through BANK 7 PRIORITY 60h via respective cables 210a through 210h. The addresses received into BANK MULTIPLEXOR 60i through portals SP0, SP1, IOP, and IP—which addresses are 17 bits in length and sufficient therefore to address any four word boundary within each of the storage memory banks which do each contain 512K words—are likewise gated to memory banks, STORAGE MEMORY BANK 0 40a through STORAGE MEMORY BANK 7 40h, via respective cables 212a through 212h also under the gating control of signals arising at BANK 0 PRIORITY 60a through BANK 7 PRIORITY 60h which connect to such BANK MULTIPLEXOR 60i via cables 211a through 211h. It should be recognized that the 4-word width data and accompanying address which is being gated through BANK MULTIPLEXOR 60i from the SP0, SP1, IOP, and IP under the control of the bank priorities BANK 0 PRIORITY 60a through BANK 7 PRIORITY 60h is all being gated simultaneously. The bank priorities, BANK 0 PRIORITY 60a through BANK 7 PRIORITY 60h, resolve competing requests from multiples of the SP0, SP1, IOP, and IP requestors so that the request of IOP is gated before the request of IP is gated before the request of SP0 is gated before the request of SP1. The maximum number of storage memory banks, STORAGE MEMORY BANK 0 40a through STORAGE MEMORY BANK 7 40h, which may be simultaneously activated responsively to the four gatings of 4-word-wide data plus accompanying address through the BANK MULTIPLEXOR 60i is actually 5, and not 4. Five of the storage memory banks may be activated only upon the non conflicting requests to such from SP0, SP1, the highest priority IOP, and a highest priority IP which is also performing the block read operation. All eight storage memory banks, which have a 90 nanosecond cycle time, may be simultaneously active from having been activated upon successive 30 nanosecond periods.

Continuing in FIG. 1, and returning to the manner of granting priority in order that timing may be first discussed, it should be known that upon the granting of bank priority by BANK 0 PRIORITY 60a through BANK 7 PRIORITY 60h an acknowledge signal is returned, via paths not shown, to the respective one of the ports which did give rise to that request now gated in bank priority. Such acknowledge(s) is (are) returned either to REQ STACK & CTRL 82, to REQ STACK & CTRL 84, to IOP PRIORITY 52, and/or to IP PRIORITY 68 to inform such that a request has been gated to the appropriate memory bank, and that the requester may be acknowledged and another subsequent request obtained therefrom. In the case of the SP0 and SP1 interface ports, such next subsequent request from the SP goes on the 8-deep request stacks. Also responsively to such acknowledge, the SP0 DATA STACK 82, the SP1 DATA STACK 84, the IOP DATA MUX 56, and the IP DATA MUX/STACK 72 will be controlled by the associated request logic to no longer hold the current data and address upon the paths to BANK MULTIPLEXOR 60i, but rather to emplace next subsequent data and address upon such paths. Finally, the return to this bank priority acknowledge to a port the request from which gave rise to same, for example, the return of an acknowledge from BANK 0 PRIORITY 60a to the REQ STACK & CTRL and SP0 DATA STACK 82, does allow of the issuance of further, subsequent, requests. In the case of the SP ports, such subsequent requests responsive to such acknowledges will issue off the stacks of the SP ports at a period of 30 nanoseconds. The continued communication of each acknoledge, across long cables, to the requestor, the processing of such acknowledge within a requestor, and the return responsively to such acknowledge of a further request is at a timing such that if five successive such requests are stacked, as is exceeded by the 8-deep request stacks for the SP0 and SP1 ports, then such request stacks will not be empty (repetitive SP requests ensuing) even should successive requests be honored from such stacks at a rate of 30 nanoseconds. In attainment of this fastest, 30 nanoseconds, response time to consecutive requests it should be known that each of the storage memory banks, STORAGE MEMORY BANK 0 40a through STORAGE MEMORY BANK 7 40h, has a 90 nanosecond cycle time. Therefore, consecutive requests need reference successive (as will be the case when addressing is incrementally increasing by four), or at least different, ones of the storage memory banks upon each of up to three consecutive subsequent requests if the fastest, 30 nanoseconds, operational rate is to be obtained.

The manner of the prioritized requesting and addressing of eight memory banks, STORAGE MEMORY BANK 0 40a through STORAGE MEMORY BANK 7 40h, having been preliminarily seen in FIG. 1, a further statement upon the time performance of the HPSU is possible. Each of the eight memory banks, STORAGE MEMORY BANK 0 40a through STORAGE MEMORY BANK 7 40h, can each read or write four words each 90 nanoseconds. The total bandpass of all eight such memory modules is thusly 355.55 megawords per second, or 12.8 gigabits per second. When indexing (normally consecutively) through successive ones of the memory banks, each of the SP0 and SP1 data ports can support the reading and/or writing of four words each 30 nanoseconds. This is equivalent to a bandwidth of 133.33 megawords per second for each such port, or 9.6 gigabits per second for both such ports combined. The bandpass to the IOP's, collectively, is in respect of the concurrency of pending requests from plural IOP's, and the time which it takes to communicate the acknowledge of each such request back to the associated IOP and receive, responsively thereto, a next subsequent request. Such numbers of IOP's and times of interface communication limits reading and writing on the collective IOP ports to two words per 120 nanoseconds, or 16.66 megawords per second, or 600 megabits per second. The collective ports of communication to the IP's would exhibit like performance, save only that the block read mode, supported only to the IP's, does enable of the transfer of eight words every 240 nanoseconds, which is equal to 33.33 megawords per second, which is equal to 1.2 gigabits per second for the 36-bit words of the present invention. The total bandpass of the HPSU actually utilizable is thusly 133.33 megawords per second to each of two SP ports, 16.66 megawords per second to the ports of the IOP's collectively, and 33.33 megawords per second to the ports of the IP's collectively; a total 316.66 megawords per second, or 11.4 gigabits per second. The design accommodation visible in FIG. 1 which makes such high performance possible are as follows. The memory is 8-way interleaved: each of the storage memory banks, STORAGE MEMORY BANK 0 40a through STORAGE MEMORY BANK 7 40h, is independently addressable and simultaneously operatable. There is a request (and data and address and function) stack for each of the highest performance SP ports. Such stacks, holding requests 8-deep in the present invention, are primarily useful to requestors which do make ordered references to vast amounts of data, and which do make references to instructions and particularly to branching address references proceeding from such instructions much more seldomly. Such is the nature of array, or vector, processors such as are the SP's supported by the HPSU. Finally, if a large number of requestors, ten in the case of the present invention, are to be granted parallel access to the common memory stores, then it is of utility that the priority determination amongst such should be accomplished at minimum delay to the highest priority, highest speed, channels. This is accomplished in the HPSU shown in the block diagram of FIG. 1 by a 2-level priority determination: a first-level priority determination amongst four IOP's in IOP PRIORITY 52 and amongst four IP's in IP PRIORITY 68, with a second-level, bank, priority determination amongst two SP's, the prioritized IOP, and the prioritized IP in the bank priorities, BANK 0 PRIORITY 60a through BANK 7 PRIORITY 60h. An "odd" address and "even" address pipeline scheme is also employed in bringing the requests and addresses from the stacks of such upon the SP ports expeditiously to the bank priorities. It may thus be realized, parallelism and multiplicity of other resource such as the storage memory banks permitting, that the performance of the present invention to read and to write data each 30 nanoseconds is essentially based on the performance of the priority network, which performance at a 30 nanoseconds pipelined cycle time to two high-speed SP ports is the more remarkable for also according prioritized service to four IOP's and four IP's.

Continuing in FIG. 1, each of the STORAGE MEMORY BANK 0 40a through STORAGE MEMORY BANK 7 40h memory stores contains 512K 36-bit words plus associated parity and error correction code bits. Each of the storage memory banks, STORAGE MEMORY BANK 0 40a through STORAGE MEMORY BANK 7 40h, receives four words (144 bits) plus 17 bits of address from the BANK MULTIPLEXER 60a via respective buses 212a through 212h. Five bits of function code are received from respective bank priority. Each of the memory storage banks, BANK 0 40a through BANK 7 40h, has four output ports—SP0, SP1, IOP, and IP output ports each of which output ports is four words wide. Each of the storage memory banks, STORAGE MEMORY BANK 0 40a through STORAGE MEMORY BANK 7 40h, receives 4 control bits from respective BANK 0 PRIORITY 60a through BANK 7 PRIORITY 60h via respective cables 210a through 210h, which 4 control lines code direct the storage memory bank to read or write data to designated one(s) only of the four parallel storage modules combined within each storage memory bank. Four storage modules, designated WORD 0, WORD 1, WORD 2, and WORD 3 storage modules, each containing 131K 36-bit words plus associated parity and error correction bits, are contained within each of the storage memory banks. The entire storage memory bank bit is addressed upon a four-word boundary, and each of the STORAGE MODULEs WORD 0 through WORD 3 therein enabled for the storage of an associated one of the four data words, WD0 to WD3 received from the BANK MULTIPLEXER 60i. In accordance with the type of function being exercised upon the storage memory bank, the signals received from the bank priority will enable that either all four words, the upper two words (WORD 0 and WORD 1), the lower two words (WORD 2 and WORD 3), or an individual one (WORD 0 through WORD 3) of the STORAGE MODULES will be written with data during a single write operation. The ports SP0, SP1, TOP, and IP occurring on each of the STORAGE MODULEs, WORD 0 through WORD 3, are one data word in width, the combination of four such of each type as appear on STORAGE MODULEs WORD 0 through WORD 3 combining to form the total four-word wide data buses of respective type SP0, SP1, IOP, and IP which are illustrated to be the four output ports of each of the storage memory modules shown in FIG. 1.

Each of STORAGE MEMORY BANK 0 40a through STORAGE MEMORY BANK 7 40a has multiple output ports. Respective ones of the multiple output ports are wired-OR interconnected, meaning electrically connected in common upon a bus wherein each signal will be the logical 'OR' function of the concurrent signal drive from all output ports, between plural ones of the storage memory banks. Each of the storage memory banks, STORAGE MEMORY BANK 0 40a through STORAGE MEMORY BANK 7 40h, receives a two bit code from the respective bank priority, BANK 0 PRIORITY 60a through BANK 7 PRIORITY 60h, which two bit code identifies whether the storage memory bank is being requested by SP0, SP1, an IOP, or an IP. The storage memory bank utilizes this two bit code, which may be considered to be transferred on connective paths not shown in FIG. 1 but which are parallel to cables 210a through 210h, to select a corresponding single one output port, the SP0 or SP1 or IOP or IP output port, through which, and onto the wired-OR interconnection bus connected thereto, four words of read data plus associated parity bits will be gated. Each of the eight storage memory banks actually consists of four parallel storage modules each storing one word of data plus associated check and parity bits. It is actually each of these four parallel storage modules which is controlled, in parallel, to gate one word plus associated parity bits onto one wired-OR bus: the four storage modules acting in parallel to gate either four words or two words or one word—as the case may be as established by the word enablements carried on cables 210a–h—always onto but a single one of the SP0, SP1, IOP, or IP wired-OR communication busses. Since the prioritization simultaneously performed in each bank priority, BANK 0 PRIORITY 60a through BANK 7 PRIORITY 60h, is between a maximum of four requests arising from SP0, SP1, the highest priority one IOP, and the highest priority one IP, a maximum of four storage memory banks will be requested/initiated upon any one 30 nanosecond cycle, and will resultantly to such request/initiation simultaneously produce read data some 120 nanoseconds later. Since each of the maximum four requests was from a different type of requestor—a SP0, a SP1, and IOP, or an IP—then one only storage memory bank will be controlled to utilize each wired-OR communication bus at any one time. When the actual communication time on these buses is in the order of 21.5 nanoseconds, each and every one will normally be in used upon each 30 nanosecond pipelined cycle time of the High Performance Storage Unit, meaning that the utilization duty cycle is good and that this dense (8 storage memory banks×4 storage modules/storage memory bank×(36 data+4 parity) bits/storage module=1280 bits are communicatable), fast (signal communication time equals 22.5 nanoseconds) distributive (data from a total of eight storage memory banks may be transmitted (upon plural cycles) to a total of four types of HPSU output ports) communication network operating over some distance (approximately one meter) and with some power consumption should incur minimum cost.

Continuing in FIG. 1, the manner of communication from the storage memory banks, STORAGE MEMORY BANK 0 40a through STORAGE MEMORY BANK 7 40h, to those registers 102a through 102d, which registers provide the final output communication from the HPSU to ten requestors of three types, is accomplished by a combination of wired-OR and logical OR selection and enablement of communication interconnection. Commencing with the interface from the four-word wide SP0 port of each of the four memory storage banks to the OR/REG 102a which is the final register and driver interface to bus 204 communicating at a four-word wide data width to SP0, such interface may be observed to be composed of buses 213a and 213b. The SP0 output ports of the zeroeth, second, fourth, and sixth storage memory banks, STORAGE MEMORY BANK 0 40a, STORAGE MEMORY BANK 2 40c, STORAGE MEMORY BANK 4 40e, and STORAGE MEMORY BANK 6 40g, are wired-OR into the single four-word wide bus 213a. Likewise, the SP0 data output port of banks 1, 3, 5, and 7—STORAGE MEMORY BANK 1, 40b, STORAGE MEMORY BANK 3 40d, STORAGE MEMORY BANK 5 40f, and STORAGE MEMORY BANK 7 40h—are wired-OR into the single four-word wide data bus 213b. The OR/REG 102a for the SP0 interface to the HPSU will receive a gating signal derived from address bit 21 (the even/odd bank selection bit of the address) which was held in SP0 DATA STACK 82, in order by such gating signal to gate the appropriate bus, and four-word wide data quantity received thereupon into OR/REG 102a.

It should be recalled that due to the function of the bank priorities, BANK 0 PRIORITY 60a through BANK 7 PRIORITY 60h, one only of the storage memory banks, STORAGE MEMORY BANK 0 40a through STORAGE MEMORY BANK 7 40h, will be reading a four-word data quantity to the SP0 port at any one time. Thusly, all eight storage memory banks could have been wired-OR in the SP0 port outputs thereof because one only of such storage memory banks are active at any one time. Such totally wired-OR interconnection would be similar to the manner by which such storage memory banks are currently wired-OR by even and odd paths. The reason why a wired-OR interconnect is utilized between four only storage memory banks, and the two wired-OR bus interconnects thereby created between eight banks are then further gated by logical OR means within output registers, is that the physical length of interconnect, and characteristic load impedences, of these buses and of the elements connected thereto dictate that the mode and manner of interconnect should be substantially as shown in economical support of high performance. In point of fact, the OR/REG 102a is physically located midway between the even storage memory banks and the odd storage memory banks, the illustrated combination of two wired-OR buses communicative thereto thereby offering minimum signal communication time if, as is the case, the logical OR function between such two buses 213a and 213b is accomplished within OR/REG 102a at a shorter time than the signal transmission across the finite physical width, and finite impedance, of four storage memory modules. In other words, and in consideration that the HPSU stores 4M 36-bit words, what is under consideration in the area of electrical communication from the storage memory banks, necessarily of physical size, which store such 4M data words to those singular output ports which will communicate four words with a total HPSU pipeline latency (read access time) as low as 240 nanoseconds (although such time obviously includes more than just the time of communication from the storage memory banks to the output registers) is a method of, and apparatus for, wired-OR connection in combination with logic OR connection for, and in support, of high performance. This high performance communication will transpire in 22.5 nanoseconds. Wired-OR interconnection between storage memory modules and output registers is made possible only because each storage memory module does have multiple output ports, and because between all such storage memory modules only one such will emplace read data upn any one port at any one time.

Continuing in FIG. 1 with the explanation of that interconnection structure which is, in aggregate, supportive of the transfer of 11.4 gigabits per second from the storage memory banks, STORAGE MEMORY BANK 0 40a through STORAGE MEMORY BANK 7 40h, to the communication output registers, REGISTERs 102a through 102d, the communication between the SP1 output port of each of the eight storage memory banks to the OR/REG 102b, which is the interface register via four-word wide bus 205 to SP1, is accomplished identically to the manner of communication with SP0 just described. Communication between the IP ports of each of the storage memory banks, STORAGE MEMORY BANK 0 40a through STORAGE MEMORY BANK 7 40h, to the AND/OR/STACK/REG 102d, and communication between the IOP port of each of the storage memory banks and the AND-OR/REG 102c is for each likewise but a combination of two wired-OR buses, one of which is connected to the even ones and one of which is connected to the odd ones of the storage memory banks. Each of the buses is further illustrated, however, to be split into a lower and into an upper half, such as is most readily apparent in illustration of lower half buses 214a1 and 214b1, and in the illustration of upper half buses 214a2 and 214b2, in the connection of the IP port of the storage memory banks to AND-OR-STACK/REG 102d. The lower half bus carries the two words, WORD 0 and WORD 1, which are output of the respective two STORAGE MODULEs of each storage memory bank, whereas the upper half bus carries the two words, WORD 2 and WORD 3, which are outputs of the remaining two STORAGE MODULEs of each storage memory bank. Recall that upon a normal, two-word read to either an IP or an IOP only the WORD 0-WORD 1, or the WORD 2-WORD 3 pair of the STORAGE MODULEs will be enabled, in accordance with the function code received by and interpreted within each of the storage memory banks, for output. Since during a two-word read operation to an IP as controlled by the bank priority, BANK 0 PRIORITY 60a through BANK 7 PRIORITY, only one of the storage memory banks, STORAGE MEMORY BANK 0 40a through STORAGE MEMORY BANK 7 40h, will be reading to an IP at any one time, then one only of the paths 214a1, 214a2, 214b1, and 214b2 will contain valid read information at any one time. Similarily to the way that the gating signal derived from bit 21 of the address held in SP0 DATA STACK 82 was passed to the SP0 output register OR/REG 102a, a gating signal derived from bit 21 of the address held in IP DATA MUX/STACK 72 will be transferred (path not shown in FIG. 2) to the AND-OR-STACK/REG 102d to cause the gating of either those buses 214a1, 214a2 connective to the even storage memory banks or those buses 214b, 214b2 connective to the odd storage memory banks. Furthermore, a second gating signal derived from bit 22 of the address held in the IP DATA MUX/STACK 72 will also be transferred (path not shown in FIG. 1) to the AND-OR-STACK/REG 102d to cause the gating of either the lower two-word pair carried on buses 214a1 and 214b1 or the upper two-word pair carried on buses 214a2 and 214b2.

The AND-OR-STACK/REG 102d also receives additional information (resultantly from the acknowledgement by the bank priorities) from IP PRIORITY 68, which information does permit of the selection of communication with the proper IP, IO0 through IP3. This selection information is derived from the 2-bit port code from IP PRIORITY 68 carried on cable 70 (path of connection to AND-OR-STACK-REG 102d now shown in FIG. 1). Communication of data from the storage memory banks to the AND-OR/REG 102c and subsequent communication to a selected one of IOP0 through IOP3 across buses 206 transpires in an equivalent manner.

Continuing in FIG. 1, there is additional support in the interconnection between the storage memory banks, STORAGE MEMORY BANK 0 40a through STORAGE MEMORY BANK 7 40h, and the AND-OR-STACK/REG 102d (which is the output register to the IP's) by lower buses 214a1, 214b1 and by upper buses 214a2, 214b2 for the special block read function which is capable of being performed (only) to an IP port. During the block read function, two of the storage memory banks are twice simultaneously operative to respectively twice produce a WORD 0-WORD 1 pair and WORD 2-WORD 3 pair in joint constitution of a eight-word data quantity to be read to an IP. Such a eight-word quantity is transmitted by four words upon bus 214a1 and 214b1, and by remaining four words upon bus 214a2 and 214b2, from the selected two memory banks to the AND-OR-STACK/REG 102d. It is because of this function that the word "STACK" appears within the title of AND-OR-STACK/REG 102d: the eight words being held in a stack prior to their issuance, most significant word pair first, by two-word pairs to that IP performing the block read function.

Additionally appearing in FIG. 1 are DC & COMPARE 215 referring to dayclock and comparison circuitry, AUTO TIMER 216 and SYS STATUS 217 which represent additional, miscellaneous functions enabled within the memory. The dayclock and auto timer are loaded from the IP, and show a communication path from such by IP DATA MUX/STACK 72 via bus 74. Additionally, the dayclock of D.C. & COMPARE 215 and the sytem status register of SYS STATUS 217 may be selectively addressably read to the AND-OR-STACK/REG 102d via respective buses 218 and 219, and then output to the IP interrogating such. These miscellaneous functions, although noted for the sake of completeness, are not integral to the function of the present invention.

E. Timing of the HPSU within which the Circuit Apparatus of the Present Invention Resides The apparatus of a High Performance Storage Unit within which the present invention is contained, the block diagram of which was seen in FIG. 1, supports of the synchronous communication to requestors of, and at, two different interface cycle times. Specifically, the HPSU communicates to one type of requestor, called a Scientific Processor or SP, at a pipelined interface communication cycle time of 30 nanoseconds (within which interface communication cycle four 36-bit data words may be transferred). The HPSU also supports synchronous communication with requestors of a second interface cycle time, requestors identified either as instruction processors or IP's or as input output processors or IOP's, which second interface cycle time is 60 nanoseconds (during each which two 36-bit data words may be transferred). That these two cycle times are in integral relationship to each other (i.e., 2:1) is irrelevant: the only requirement being that there should be a common interval, or clock base, which divides integrally into both such cycle periods. In the HPSU this clock space interval is 7.5 nanoseconds, of which there are four such intervals, or a four-phase clock, in support of the 30 nanosecond interface cycle time and of which there are eight such, or an eight-phase clock, in support of the 60 nanosecond cycle time interface.

Although it is only incidental that the two interface cycle times (60 nanoseconds and 30 nanoseconds) supported are in integral relationship (2:1), it is of greater significance that any HPSU internal function commonly exercised by the requestors of two different interface cycle times, such as the internal read/write cycle time of the storage memory bank is, and can be by definition, in fixed time relationship to one only of the two interface cycle times. The HPSU internal functions are timed by a clock relational to its fastest interface, ergo a four-phase 30 nanosecond clock. (Conversely, it could be said that a 30 nanosecond interface cycle time can exist only because there is an HPSU clock to support such.) Consider, for example, the read/write function of the storage memory banks relative to the four-phase 30 nanosecond clock. Both the read/write cycle time and the access time of the storage memory banks are longer than 30 nanoseconds, ergo in a pipelined organization of the HPSU at a 30 nanosecond period both such read/write cycle time and such access time must be multiples of such 30 nanosecond period. This is indeed the case: the read/write cycle time of 90 nanoseconds is in 3:1 integral relationship with the 30 nanosecond pipelined HPSU cycle time which is the faster (SP) interface communication cycle time, and the access time of 120 nanoseconds is in 4:1 integral relationship with the 30 nanosecond interface communication cycle time. Most importantly for recognition of the timing complexities required to be solved in the HPSU apparatus, it should be noted that the initiation (upon availability after each 90 nanosecond read/write cycle time) of any storage memory bank is always at the same phase (actually $\phi 3$) of the four-phase 30 nanosecond clock, and the gating of read data from such storage memory bank (120 nanoseconds later) will also be always at the same phase ($\phi 3$) of the four-phase 30 nanosecond clock.

Figure 3:
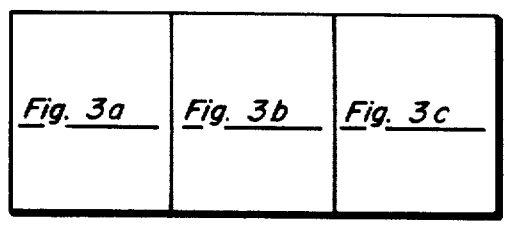
FIG. 3, consisting of FIG. 3a through FIG. 3c shows a timing diagram of the 8-phase and of the 4-phase clocks which are utilized by different types of requestors in communication with the HPSU, and the possible times of occurrence of the initiation of reading the storage memory bank, and of the gating of the results output therefrom such reading, relative to the clock phases of each of the 4-phase and 8-phase clock timing chains.

Now consider the interaction of a second, 60 nanosecond cycle time, communication interface with the functions, such as the internal read/write cycle time of the storage memory banks, of the HPSU exercised of fixed times (phases) relative to the 30 nanosecond clock cycle. It is obvious that HPSU internal functions, such as the read/write cycle time of the storage memory banks, if uniformly initiated relative to the faster, 30 nanosecond, clock cycle (and the next two paragraphs will explain that not to do so is inefficient) will not always occur at the same time, meaning clock phase, relative to the 60 nanosecond interface communication cycle time. For example, the phase of the four-phase 30 nanosecond clock which both gates initiation of the storage memory banks and the gating of read data therefrom (shown respectively as signals E and F in FIG. 2)

can occur at either $\phi3$ or $\phi7$ of the eight-phase 60 nanosecond clock, as may be visualized by momentary reference to FIG. 3. Now there is no appreciable problem to synchronizing a request occurring (from an IP or an IOP) upon the slower, 60 nanosecond interface cycle time, communications interface with the faster 30 nanosecond pipelined cycle time of the storage memory banks. But there is a problem in resynchronizing the data read of such storage memory banks with such a slower, 60 nanosecond interface cycle time, communications interface. Incidentally, this problem arises even should such slower interface cycle time be in an integral relationship to the read/write cycle time of the storage memory banks (60 nanoseconds not being in an integral relationship to 90 nanoseconds). The reader may consider the relationship between the phases of a four-phase 30 nanosecond clock and all corresponding phases of a co-incident twelve-phase 90 nanosecond clock, or of a six-phase 45 nanosecond clock, or of a five-phase 52.5 nanosecond clock in order to discern that resynchronization must always occur for simultaneous operation at two different interface communication cycle times.

Figure 3A:
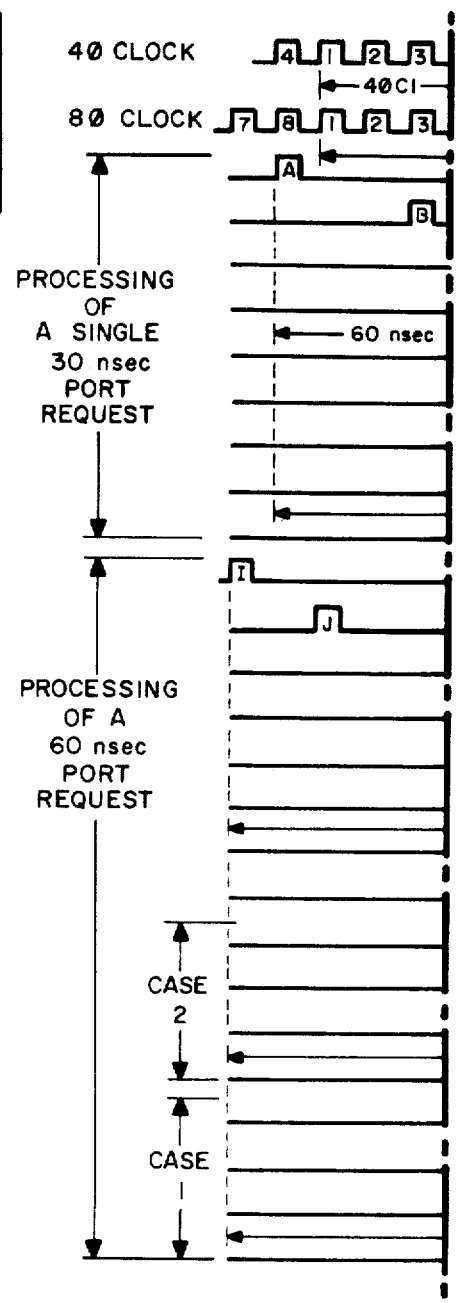
Figure 3B:
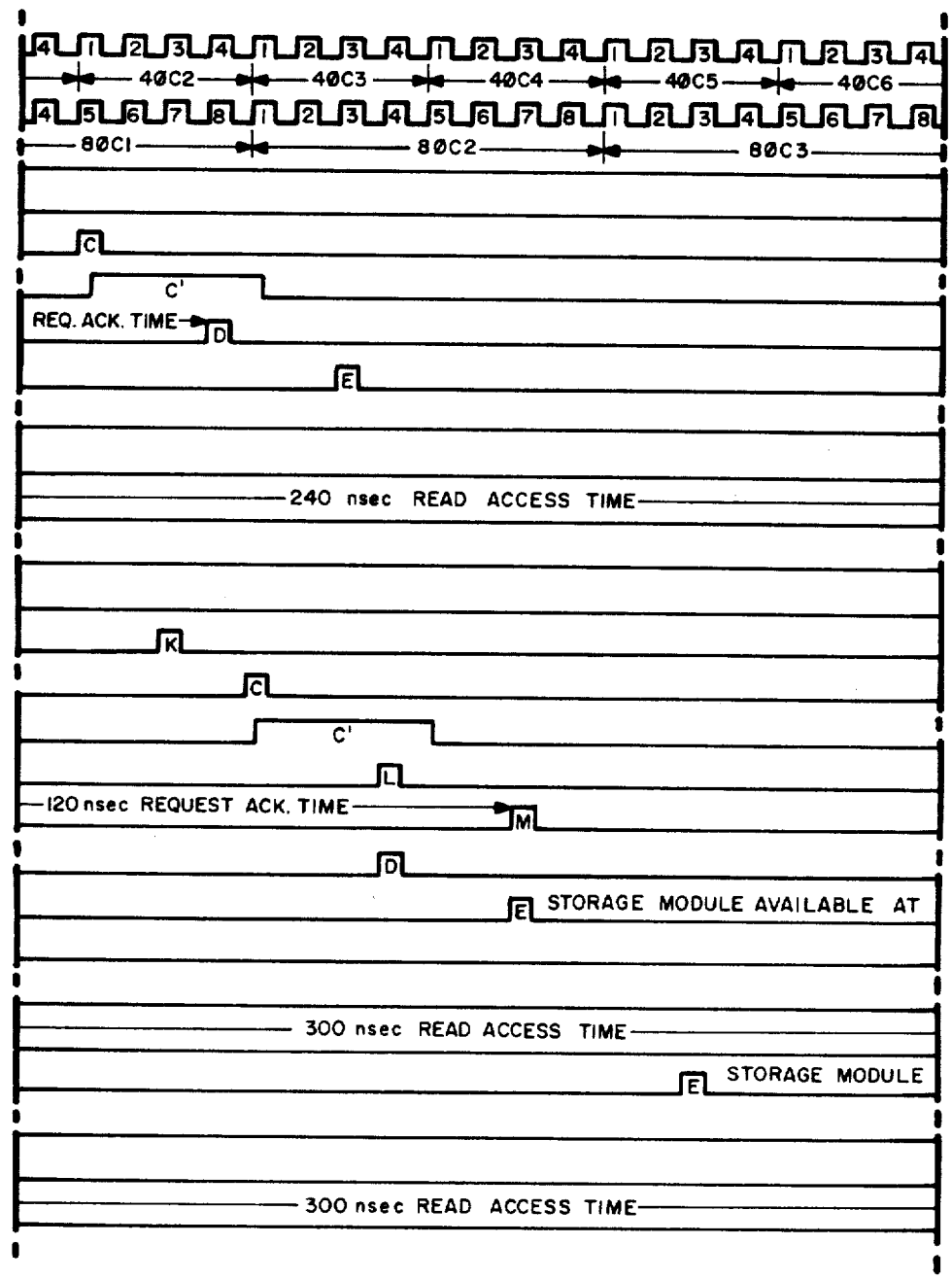
Figure 3C:
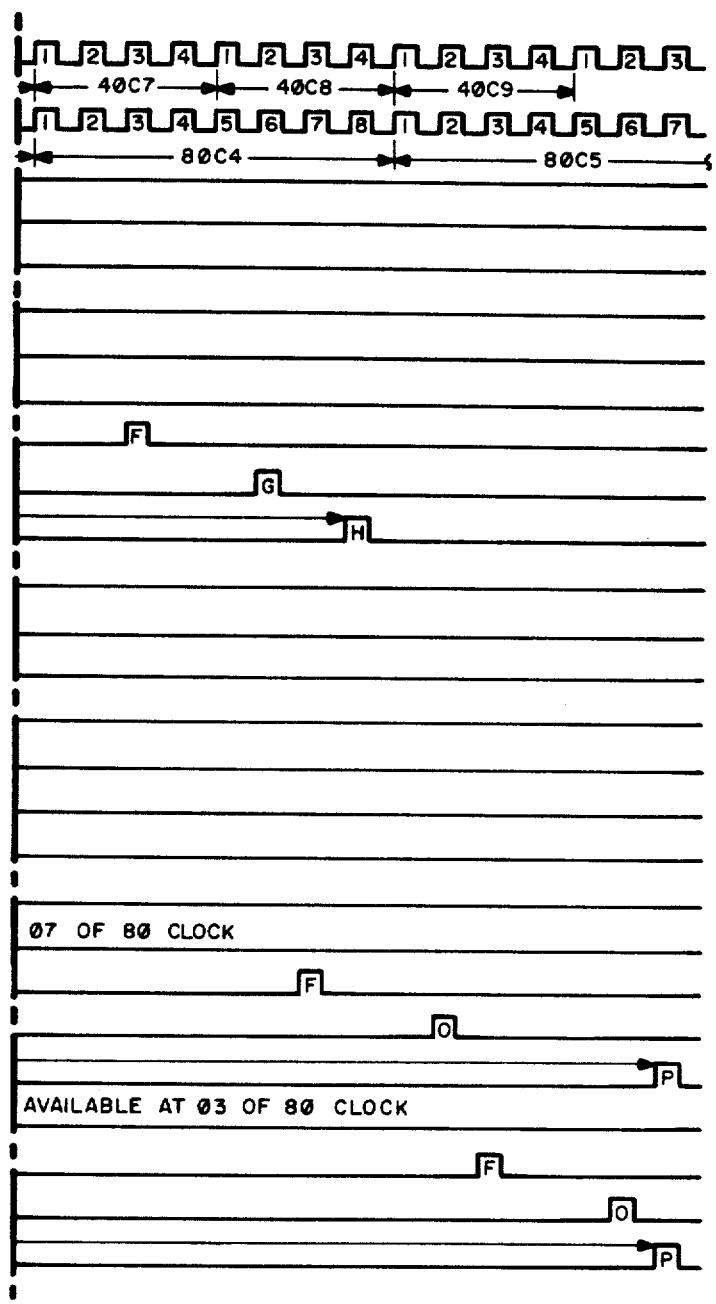

The timing of the High Performance Storage Unit (HPSU) in support of its capability to synchronously communicate with requestors of two different interface cycle times, while simultaneously enabling that the storage memory banks therein the HPSU should not incur read/write cycle time greater than electronically necessary in order merely to support of such interface communication at plural interface cycle times, is shown in FIG. 2. The block diagram of the essential timing of the HPSU is shown in FIG. 3, consisting of FIG. 3a through FIG. 3c. In FIG. 2 all timing to the left of the dashed line is enabled by a clock of period 7.5 nanoseconds, the phases of which are labelled 1 through 4, ergo a 4-phase clock. All timing to the right of the dashed line is enabled by the selfsame coincident and identical clock pulses of phase 7.5 nanoseconds save that such phases are numbered 1 through 8, ergo constituting an 8-phase clock. The relationship between the phases of the 4-phase clock and those of the 8-phase clock, which are seen to be the identical clock save only for the designation of the phases, is seen within the timing diagram of FIG. 3. The 4-phase clock supports of a 30 nanosecond communications cycle time synchronous interface to the Scientific Processor, or SP, the input signals from which SP may be seen at the bottom, and the output signals to which SP may be seen at the top, of that area to the left of the dashed line. The 8-phase clock supports a 60 nanosecond communications cycle time synchronous interface to the Instruction Processors or IP's and to also the Input/Output Processors or IOP's, the input signals from which are seen at the bottom, and the output signals to which are seen at the top, of that area to the right of the dashed line within FIG. 2.

Continuing in FIG. 2, the REQ STACK & CNTRL 82 (partial), 84 (partial) shown therein was previously shown in FIG. 1 to receive the request, address, data and function from both SP0 and SP1. Such is clocked into the IF REG within the REQ STACK & CTRL 82 (partial), 84 (partial) by clock $\phi4$. Likewise, considering to the right of the dashed line the IOP, IP DATA MUX IOP, IP PRIORITY 52, 54, 68, 72, also previously seen in FIG. 1, receives the request, address, data, function, and start/end information from the IP's and IOP's. This information is clocked into the interface register IF/REG by clock $\phi7$ of the 8-phase clock. The requests received of the SP's, clocked at $\phi4$ of the 4-phase clock, and those received of the IP's and IOP's, clocked at $\phi7$ of the 8-phase clock (which clock times are not identical) must first be brought into synchronization at a common priority network. Thusly, the first problem encountered is merely being able to synchronize those request signals received from the SP via cables 90, 98 with those received of the IP's and IOP's received via cables 60, 80 at the PRI (BANK) 60, which is the common bank priority network. This synchronization is very simple, almost trivial. Consider that all requestors are gated into bank priority PRI (BANK) 60 upon clock $\phi1$ of the 4-phase clock. Within the IOP, IP DATA MUX IOP, IP PRIORITY 52, 54, 68, 72 the requests from the IP's and IOP's which were clocked into the IF REG thereof on clock $\phi7$ of the 8-phase clock are subsequently clocked through the first-level priority consisting of PRI and REG during clock $\phi1$ of the 8-phase clock and finally into the function decoder ending at a register FUNC DEC and REG upon the clock $\phi7$ (of the 8-phase clock) of the next subsequent cycle. All such clocked timing, as is the two clock phases (15 nanoseconds) allowed for transmission upon cables 66, 80, is taken in consideration of the delays incurred within, and between, the associated circuit elements. Likewise considering the SP REQ STACK & CTRL, DATA STACK 82 (partial), 84 (partial), the requests received of the SP's which were clocked into the IF REG interface register therein upon clock $\phi4$ of the 4-phase clock are entered into the STACK. Earliest requests leaving the STACK are clocked into the decoder and register DEC-REG upon clock $\phi3$ (of the 4-phase clock) of the next subsequent cycle. Referring to the pulse trains of the 4$\phi$ CLOCK and 8$\phi$ CLOCK shown within the timing diagram of FIG. 3, 15 nanoseconds have been allocated for the transmission of the request signals via cables 90, 98 to the bank priority PRI (BANK) 60. It will be noted that in consideration of the differing circuitry which does handle and stack the requests of the SP's, as compared to the first-level priority determination which does transpire upon the request of the IP's and IOP's, the elapsed time until a single request received of an SP, or one received of an IP or IOP, is received at the bank priority PRI (BANK) 60 is different. This says nothing more than that the latency of the memory response to a request of an IP or an IOP will be greater than that latency of response to a SP request. In fact, the minimum elapsed time upon which a request received of an IP or IOP may be recognized at bank priority is ten clock phases or 75 nanoseconds, whereas the minimum elapsed time upon which a request received of the SP may be recognized at the same bank priority is five clock phases or 37.5 nanoseconds. The HPSU is, of course, pipelined, and the bank priority PRI (BANK) 60 is clocked upon each clock $\phi1$ occurrence of the 4-phase clock.

Continuing in FIG. 2, it may be noted that the bank priority PRI (BANK) 60 does select, in consideration of the availability of the associated memory module, from amongst the four possible types of requestors competing at this level (SP0, SP1, a first-level prioritized IOP, and a first-level prioritized IP) the highest priority one requestor extremely quickly, returning an acknowledge signal C' to that single requestor which wins bank priority at time $\phi1+5$ ns, or only 5 nanoseconds after the bank priority was gated upon the occurrence of $\phi1$ of the 4-phase clock. If returned to the SP REQ STACK & CTRL, DATA STACK 82 (partial), 84 (partial), this acknowledge signal permits of the read of a next request from the STACK, and the much later gating of this bank-priority-winning condition by clock $\phi4$ of the 4-phase clock in the AND/OR element to send the ACK acknowledge signal across the interface to the SP requestor. Similarly, if the signal C' at $\phi1+5$ ns is routed to IOP, IP DATA MUX IOP, IP priority 52, 54, 68, 72 upon the winning of bank priority by such then it is first gated into a REG therein by the occurrence of $\phi4$ of the 8-phase clock. The acknowledge signal C' at $\phi+5$ ns is thereafter gated in element AND/OR upon the interface to the priority-winning IOP or IP as the acknowledgement signal ACK by the occurrence of $\phi7$ of the 8-phase clock. The bank priority PRI (BANK) 60 produces and gates upon clock $\phi4$ of the 4-phase clock those control signals which are distributed via cables 211 to BANK MULTIPLEXOR 60$i$ (shown in FIG. 1) and via cable 210 to the storage memory bank SMB 40 (shown in FIG. 1 as STORAGE MEMORY BANK 0 40$a$ through STORAGE MEMORY BANK 7 40$h$). Note that three clock phases of time have elapsed within the second-level, bank, priority network. The path of CABLE 210 is clearly labelled as CABLE in order that the significant time spent in signal propagation thereupon may be more clearly recognized, such time as allows the clocking upon $\phi3$ of the 4-phase clock the control signals carried thereon CABLE 210 into the REG receipt register of the storage memory bank SMB 40.

Continuing in FIG. 2, it is a fixed characteristic of the storage memory bank SMB 40 that each such operates at a 120 nanoseconds access time. Thusly, that $\phi3$ of the 4-phase clock shown in the output thereof such SMB 40 is that $\phi3$ upon the fourth following complete cycle of the 4-phase clock to that $\phi3$ which did gate the input REG to such SMB 40. The fixed, 120 nanosecond, access time of the storage memory banks presents no problem to the SP interfaces which operate upon a 30 nanosecond interface cycle time. Again allowing three clock phases for receipt of signals transmitted from the (necessarily) physically dispersed modules of the storage memory banks, such signals are recovered via cable 213, 214 into REG of OR/REG 102$a,b$ upon the occurrence of clock $\phi2$ of the 4-phase clock. Such data is subsequently transferred to the interface register IF REG structure within the OR/REG 102$a,b$ upon the occurrence of clock $\phi4$ of the 4-phase clock, and transferred to the SP upon this time which is equal to that clock phase upon which the request from the SP was initially gated, and which represents an integral number of SP interface cycle times of delay therefrom (actually 8 complete cycles equalling a 240 nanosecond read access time).

The problem of recovering the data output of the fixed 90 nanosecond cycle time storage memory banks to the interfaces of 60 nanosecond cycle time for the IP and IOP is more severe. It may be readily understood that since 60 nanoseconds is not an integral fraction of 90 nanoseconds (90 nanoseconds is not an integral multiple of 60 nanoseconds), then that clock phase upon which the storage memory bank SMB 40 does both initiate, and does some 90 nanoseconds later start a next subsequent read/write cycle if a request is present, cannot always be in identical relationship to a set phase of the 8-phase clock, such as $\phi7$ of the 8-phase clock which gates the requests from the IP's and IOP's. For example, referring to FIG. 3, signal E shown therein is the signal, High-going when true, which is coincident with $\phi3$ of the 4-phase clock to both initiate the storage memory bank and to start a next subsequent storage module cycle 90 nanoseconds from the previous initiation. It may be noted that while the occurrence of this signal for the first case of storage module availability within the timing diagram of FIG. 3 is coincident with $\phi7$ of the 8-phase clock, the occurrence of this signal at a separation of 90 nanoseconds is coincident with storage module availability at $\phi3$ of the 8-phase clock. If the output of the storage memory bank SMB 40 as carried upon cables 213, 214 is to be gated into the receiving REG of AND-OR/REG. 102$c,d$ upon the fourth clock phase following such output availability, then said gating will be at either time $\phi2$ or at time $\phi6$ of the 8-phase clock. Reference signal O, High-going when true, shown in FIG. 3 which is intended to illustrate, at respective times $\phi2$ and $\phi6$ the 4-phase clock, the gating into REG of the AND-OR/REG. 102$c,d$ (shown in FIG. 2) of that data output from the storage memory bank. Returning momentarily to FIG. 2, the data from the memory recovered into REG of the AND-OR/REG. 102$c,d$ upon either $\phi2$ or $\phi6$ of the 8-phase clock is held therein until being multiplexed in MUX to the IF REG, wherein it is gated upon the occurrence of $\phi7$ of the 8-phase clock, for communication to the appropriate IP or IOP.

The gating signals A through P which are shown in FIG. 2 are again shown in the timing diagram of FIG. 3. The progress of (1) a single request from an SP requestor upon the 30 nanosecond interface communication cycle time interface, (2) a request arising at an IOP or IP requestor upon the 60 nanosecond interface communication cycle time interface which request does, in the first case, find the memory storage module available at $\phi3$ of the 8-phase clock, and (3) a similar request arising at an IOP or IP requestor upon the 60 nanosecond interface which request does, in the second case, find the memory storage module available at $\phi7$ of the 8-phase clock, are all shown in FIG. 3. It should be remembered that the HPSU is pipelined at a 4-phase, 30 nanosecond, clock rate and that all gating signals, enabling conditions such as storage memory bank availability permitting, will be repeated many times during the nine successive cycles of the 4-phase clock (almost five successive cycles of the 8-phase clock) shown in FIG. 3. The progress of but single requests is illustrated for clarity. The phase of occurrence of all signals A through P may be observed to be in accordance with FIG. 2. Furthermore, the 60 nanosecond request acknowledge time (REQ. ACK TIME) and the 240 nanosecond READ ACCESS TIME may be observed for the SP interface ports The 120 nanosecond REQUEST ACK. TIME to IOP or IP port request may be observed, and it may be noted that the READ ACCESS TIME of such IOP or IP ports is invariant at 300 nanoseconds regardless of whether the case I or case II condition holds true concerning the availability of the memory storage module relative to the gating of the read request from the IOP or IP ports.

Returning to FIG. 2, the choice of either $\phi2$ or $\phi6$ of the 8-phase clock and the application thereof to the entrance register REG of the AND-OR/REG. 102$c,d$ is that resynchronization operation which is crucial to the operation of the HPSU to communicate with a class of requestors (the IP's and IOP's) which have an interface cycle time (60 nanoseconds) which is not equal to the interface cycle time (30 nanoseconds) of another class of requestors (the SP's). Most notably, the timely recovery of the data results of the storage memory bank SMB 40 into the REG of the AND-OR/REG. 102c,d will free the storage memory bank to the further service of other requestors, additional pending IP and IOP requests, and, most particularly, the (most often) voluminous requests of the SP's. Note that no resynchronization problem exists with the 30 nanosecond interface of the SP's, each data result produced by the storage memory bank SMB 40 always being at a fixed time, $\phi 3$ of the 4-phase clock, relative to the 4-phase, 30 nanosecond, cycle time of the SP interface. That the results of the storage memory bank SMB 40 will be immediately recovered to the AND-OR/REG. 102c,d and resynchronized therein for communication across the IP and IOP interfaces prevents that such should have to be stored upon the output of the storage memory banks, clogging such storage memory banks and under-utilizing the full potential operational bandwidth of such storage memory banks. Inefficiency would be the result if the cycle time of the storage memory banks had been moved to 120 nanoseconds and the storage module always started concurrently with $\phi 7$ of the 8-phase clock, thereby totally eliminating any resynchronization problem but, as the price of such elimination, incurring a one-third increase in the performance speed of the storage memory modules. This one-third increase would inefficiently rebound to the utilization of same by the SP interface ports which, as has been seen, require no resynchronization to fully and effectively utilize the 90 nanosecond read-write cycle time of the storage memory banks. Optimization of the performance of the storage memory banks SMB 40 within the HPSU is causitive of the resynchronization solution to the gating of the read data to the IP and IOP interfaces. The further teaching of such resynchronization solution, which teaching is not essential to the understanding of the present invention, is contained in U.S. patent application Ser. No. 596,214 for a MULTIPLE OUTPUT PORT STORAGE MODULE to Scheuneman et al., the contents of which application are incorporated herein by reference.

F. The Circuit Apparatus of the Present Invention

The present invention is a circuit modifying the snapshot priority network prioritizing a plurality of requesters to a memory unit in order that a particular requester which is a maintenance exerciser will be disabled, or cleared, of experiencing time-outs due to atempted requests of an inoperative storage memory band. Moreover, and more importantly, requests from other requesters to operative storage memory banks will not be obstructed in being prioritized, and serviced by such storage memory banks, due to that hold on successive snapshot prioritizations which would normally occur if any previous one prioritized request, including a prioritized request of a maintenance exerciser, were not to be acknowledged. The circuit of the present invention operates to clear the pending prioritized request of the maintenance exerciser even should request not have been acknowledged, allowing thereby the timely resumption of continuing snapshot prioritization. The circuit so acting to defeat, or clear, that time-out condition which would normally be experienced upon a maintenance exerciser's attempted reference to an inoperative memory is a simple time delay circuit. If the normal acknowledgment of a referenced memory bank is not returned responsively to the prioritized request of a maintenance exerciser, then the time delay circuit will clear the pending request, defeating the sensing of a time-out occurrence at such maintenance exerciser while simultaneously allowing that continuing prioritizations should timely transpire.

Figures 4, 4A:
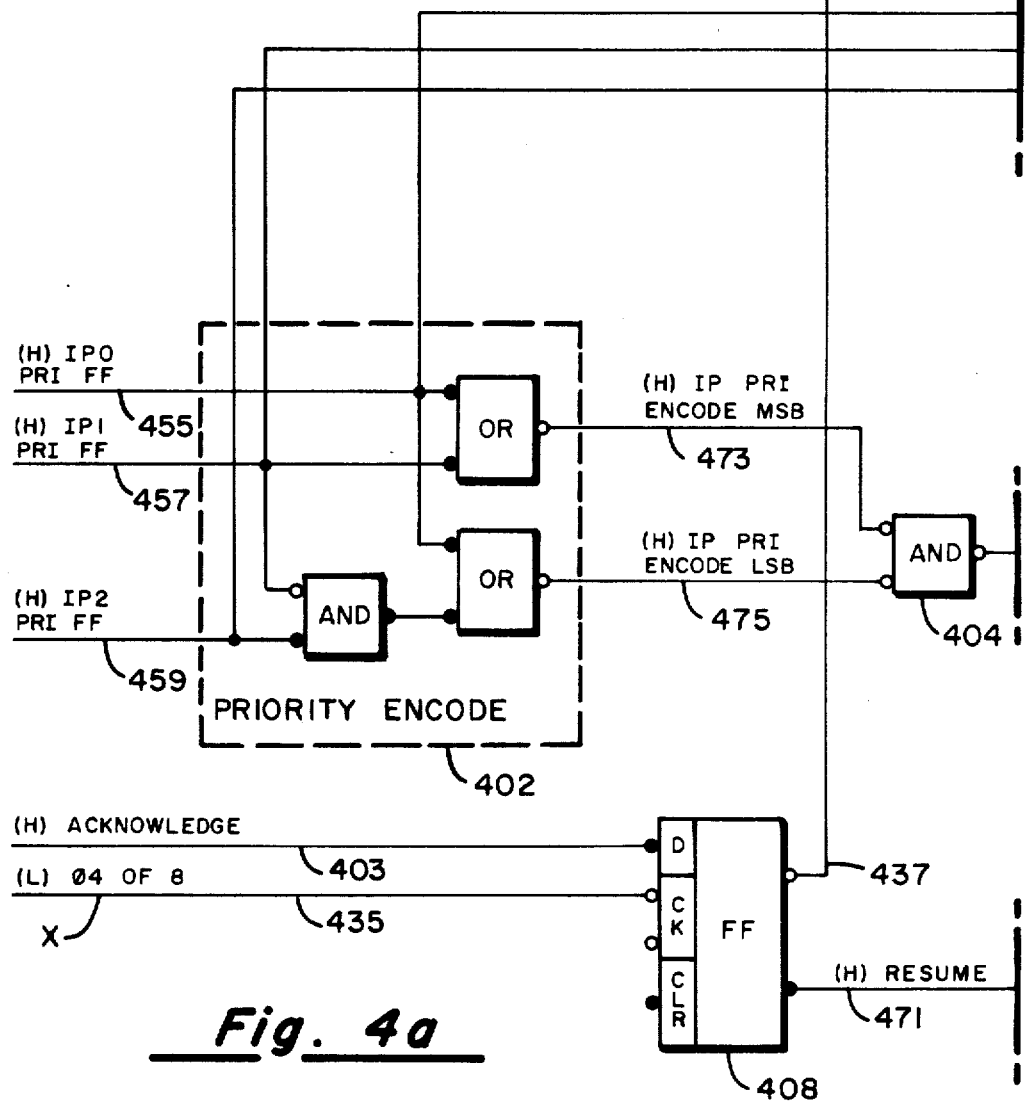
FIG. 4, consisting of FIG. 4a and FIG. 4b, shows the circuit schematic of the present invention modifying memory priority in order to produce a forced clear of a memory time-out to a maintenance exerciser.
Figure 4B:
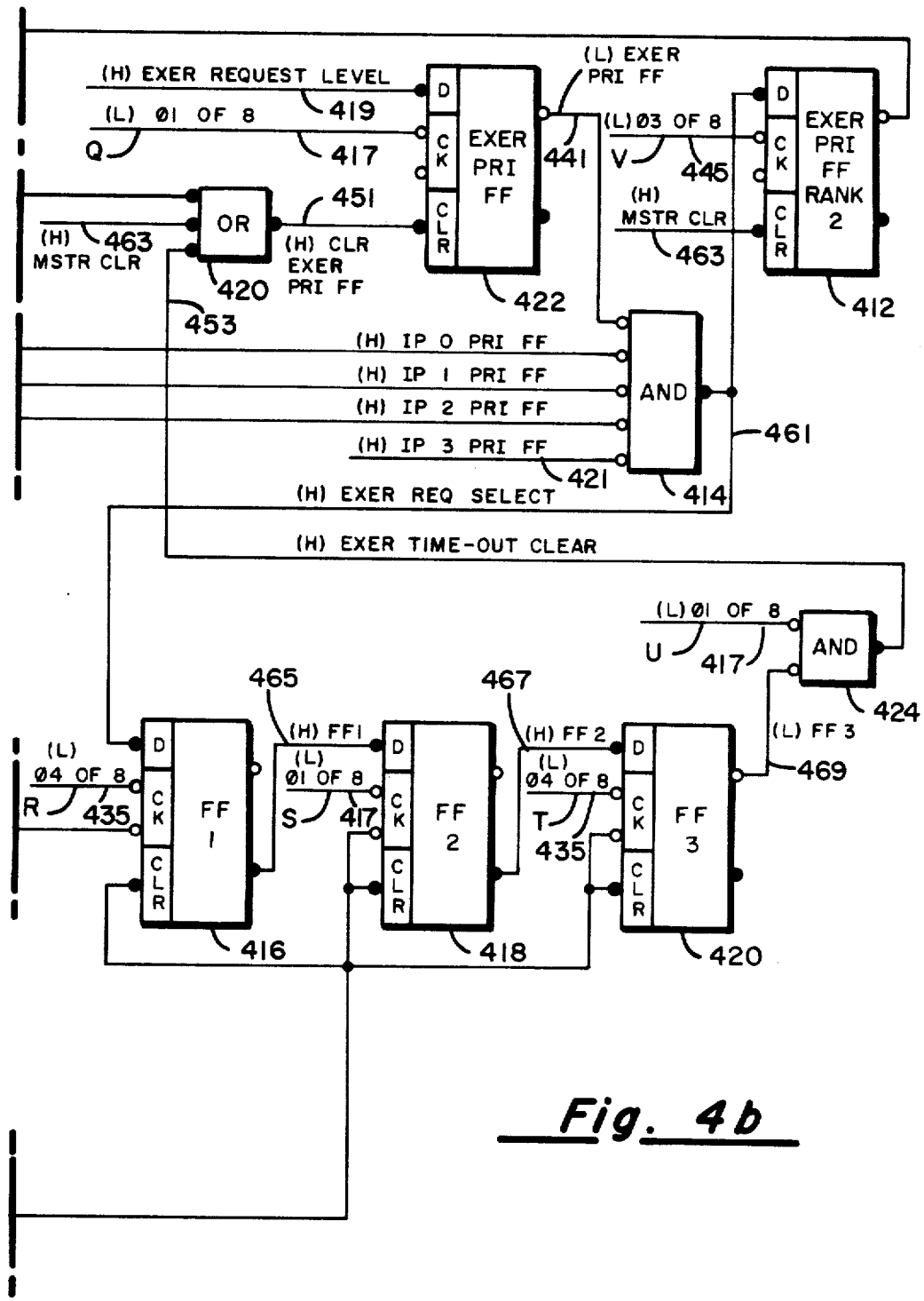

Particularly in the preferred embodiment of the present invention, the requesters which are ported to a memory unit are external instruction processors, called IP's, and an internal maintenance processor, called a maintenance exerciser. It matters not to the use of memory unit functions that one such requester is internal, and one external, nor that one of such requesters is, particularly, involved primarily in the performance of a maintenance function. As will be seen from the following explanation, all such requesters do make normal reading and writing requests of memory, and all are both fully enabled for participation in priority through their respective memory ports. The circuit of the present invention is shown in FIG. 4, consisting of FIG. 4a and FIG. 4b. This circuit may be considered to be part of IP PRIORITY 68, previously seen in the block diagram of FIG.1, although when shown therein only the memory requests of the instruction processors appeared as signals IP0 REQ through IP3 REQ on cable 203a while the request of memory from the internal maintenance exerciser was not shown within such high-level block diagram.

Continuing to relate the circuit of the present invention shown in FIG. 4 to the function of the larger high performance storage unit memory apparatus of which it is a part, and particularly to the IP3 PRIORITY 68 (shown in FIG. 1a) thereof such memory unit, it will be recalled that the acknowledge signal from the PRI (BANK) 60 (shown in FIG. 2) was returned as signal C' at time $\phi 1 + 5$ ns to the IOP, IP DATA MUX IOP, IP PRIORITY 52, 56, 68, 72 (shown in FIG. 2) to acknowledge the acceptance of a first-level prioritized request by the second-level, storage memory bank, priority. For the purposes of the present invention that this acknowledge is from a second-level priority determination, and that it is within such level associated with the numbers of storage memory banks is irrelevant. The acknowledgement signal returned on line C' to IOP, IP DATA MUX IOP, IP PRIORITY 52, 56, 68, 72, and particularly to IP PRIORITY 68 (shown in isolation in FIG. 1b) as a part thereof, may be considered to simply mean that the storage unit has accepted, and will act upon by reading or writing as directed, the currently uppermost prioritized request. Such an acknowledge signal, which will release the first-level, snapshot, priority network to present a next highest priority one request, or if all such requests have been presented to perform a new priority snap, is shown as signal (H) ACKNOWLEDGE on line 403 in FIG. 4a. Thus the circuit of the present invention shown in FIG. 4 may be considered to be a priority circuit operating intermediary a request of the maintenance exerciser resulting in the High or true condition of signal (H) EXER REQUEST LEVEL on line 419, and the acknowledgment to the prioritization of such requests received as the High, or true, condition of signal (H) ACKNOWLEDGE on line 403.

The operation of the circuit of the present invention shown in FIG. 4 is as follows. The goal of the circuit is that the maintenance exerciser priority flip-flop EXER PRI FF 422 should be cleared, or reset, even upon the occurrence of a fault condition whereupon signal (H) ACKNOWLEDGE on line 403 is not received back from following, subsequent, logics to the circuit of the present invention responsively to the prioritized request of a maintenance exerciser which is transmitted to such logics. The exerciser priority flip-flop EXER PRI FF 422, which is also identically so-identified within companion patent application U.S. Ser. No. 630,141, filed July 12, 1984, the contents of which are incorporated herein by reference (although other numerical identification should not be assumed to be so identical), becomes set, indicating the pending request of the maintenance exerciser, upon the logical High occurrence of signal (H) EXER REQUEST LEVEL on line 419 as clocked at time Q (reference FIG. 5) by the occurrence of clock phase 1 as Low signal (L) $\phi 1$ OF 8 on line 405. The signal (H) EXER REQUEST LEVEL on line 419 actually arises from a flip-flop (not shown) wherein the actual request of the maintenance exerciser is held valid from clock phase 7 to clock phase 7. For the purposes of the present invention, it is sufficient to recognize that the EXER PRI FF 422 will become set upon (each) request from the maintenance exerciser, and needs be cleared from (each) such request priorly to the conduct of a next successive (snapshot) prioritization.

Continuing in FIG. 4, in a like manner to which the maintenance exerciser priority flip-flop EXER PRI FF 422 does become set upon a request of the maintenance exerciser, flip-flops (not shown) associated with each of the four instruction processor 0 through 3 do become set upon requests from corresponding such instruction processor, respectively giving rise to signals (H) IP0 PRI FF on line 455, (H) IP1 PRI FF on line 457, (H) IP2 PRI FF on line 459, and (H) IP3 PRI FF on line 421 which are High when such requests are pending. Such active requests from the instruction processors, should such have even occurred, will be respectively sequentially (IP0 before IP1 before IP2 before IP3) cleared by the sequential reoccurrence of signal (H) ACKNOWLEDGE on line 403 as each successive request is honored at the next-level priority and at the storage memory banks. The manner in which the High occurrence of signal (H) ACKNOWLEDGE on line 403 does normally serve to clear a priority flip-flop will imminently be explained by reference to the normal clearing of the exerciser priority flip-flop. When all of the instruction processors 0 through instruction processor 3 flip-flops are cleared, as will be the case if such have never been set or if such have been cleared by acknowledgments of the requests arising therefrom during a single priority snap, then signal (H) IP0 PRI FF on line 455 through signal (H) IP3 PRI FF on line 421 will be received at AND gate 414 in a Low condition. The then occurrence of Low signal (L) EXER PRI FF on line 441, such as represents the setting of the EXER PRI FF 422, will satisfy such AND gate 414, producing High signal (H) EXER REQ SELECT on line 461 to be output therefrom. This High signal (H) EXER REQ SELECT on line 461, which represents that the maintenance exerciser is now uppermost in priority, will suffice to set the maintenance exerciser priority flip-flop RANK 2 EXER PRI FF RANK 2 412 upon the next occurrence at time V of clock phase 3 signal (L) $\phi 3$ OF 8 on line 445. The clear side signal output thereof such EXER PRI FF RANK 2 412 occurring as Low signal (L) EXER PRI FF RANK 2 on line 447 will serve as a first Low input in satisfaction of AND gate 410. Meanwhile, the uppermost prioritized request, which is now that of the maintenance exerciser, is sent by circuitry and paths not shown to next, subsequent, levels of prioritization and/or storage memory banks operation. The exact transmission, and utilization, of such a succession of snapshot prioritized signals is not of consumate importance to the present invention, the pertinent concept being only that signal (H) ACKNOWLEDGE on line 403 will be returned in the High, or true, condition if, and only if, the requested resource—which may be a next subsequent priority network and/or a storage memory bank and/or whatever—is correctly functionally operative and available. If signal (H) ACKNOWLEDGE on line 403 is not subsequently timely returned then a priority flip-flop will not be cleared, and the exerciser priority flip-flop EXER PRI FF 422 would not be cleared save for the action of the improvement circuit such as will be shortly explained, and the priority network will not progress to a next subsequent snapshot prioritization. Moreover, no new requests will be entertained and no external acknowledgments will be sent to the requestors, causing such after such interval which is substantially longer than any possible delay arising upon the correct response of a memory unit, to self-interrupt recognizing a hangup condition, which condition is commonly called a memory time-out. Therefore, the "timely" return of the true condition of signal (H) ACKNOWLEDGE on line 403 means simply that such should occur within that substantial interval of time within which access to, and performance of, the requested storage memory bank would always, even considering worst case conflicts, be expected.

Continuing in FIG. 4, the normal acknowledge response to each subsequent request, and at the lowest priority of all such requests lastly to the request of the maintenance exerciser, will occur as the High condition of signal (H) ACKNOWLEDGE on line 403 which, upon the occurrence of clock phase 4 at time X as Low signal (L) $\phi 4$ OF 8 on line 435, will suffice to set flip-flop FF 408. The clear side signal output therefrom such flip-flop FF 408 occurring as Low signal (L) RESUME on line 437 will, during the continuing Low presence of signal (L) EXER PRI FF RANK 2 on line 447 suffice to satisfy AND gate 410 upon the occurrence of clock phase 7 at time W (time of occurrence indicated in FIG. 5) as Low signal (L) $\phi 7$ OF 8 on line 411. The resultant High signal output therefrom such AND gate 410 will satisfy OR gate 420, producing High signal (H) CLR EXER PRI FF on line 451 which will clear the EXER PRI FF 422. This is the normal means by which the maintenance exerciser priority flip-flop EXER PRI FF 422 becomes cleared upon the transmission to further logics of a prioritized request resultant therefrom such maintenance exerciser, and the resultant acknowledgment of such prioritized request. It is also possible to clear the EXER PRI FF 422 by the occurrence of a master clear signal as signal (H) MSTR CLR on line 463 acting through OR gate 420, similarily as it is possible to clear EXER PRI FF RANK 2 412 upon the occurrence of the same master clear signal. The master clear is normally enabled only during system logics initialization.

The improvement circuit of the present invention essentially operates with the small amount of remaining logic elements shown in FIG. 4. The circuit comprises a time delay for the reset clearing of the maintenance exerciser priority flip-flop, the circuit consisting essentially of the three flip-flops FF1 416 through FF3 420 arranged as a sequential timing chain. The high occurrence of signal (H) EXER REQ SELECT on line 461, which means that the request of the maintenance exerciser is uppermost in priority, will be clocked by clock phase 4 occurring at time R as Low signal (L) $\phi 4$ OF 8 on line 435 to set flip-flop one FF1 416. Also required to set flip-flop one FF1 416 is a Low enablement signal arising from satisfaction of AND gate 404. Such AND gate 404 is satisfied by High signals (H) IP PRI ENCODE MSB on line 473 and (H) IP PRI ENCODE LSB on line 475 which respectively represent the most significant and least significant bits of the encode of the currently prioritized IP/maintenance exerciser request. Such encoding of the currently uppermost prioritized device is done within circuit PRIORITY ENCODE 402 responsively to the receipt of signals (H) IP0 PR1 FF on line 455, (H) IP1 PRI FF on line 457, and (H) IP2 PRI FF on line 456. Both signals (H) IP PRI MSB on line 473 and (H) IP PRI ENCODE LSB will be High, satisfying AND gate 404 and enabling the clocking of FF1 416 only when none of signals (H) IP0 PRI FF on line 455, (H) IP1 PRI FF on line 457, and (H) IP2 PRI FF on line 459 is High, meaning that either IP3 or the maintenance exerciser is currently uppermost in priority. The set side signal output therefrom occurring as High signal (H) FF1 on line 465 will set next flip-flop two FF2 418 upon the next occurrence of clock phase 1 at time S occurring as signal (L) $\phi$1 OF 8 on line 417. Similarily in the continuance of the timing chain, the set side signal output thereof such FF2 418 occurring as High signal (H) FF2 on line 467 will set the flip-flop three FF3 420 upon the occurrence at time T of clock phase 4 as Low signal (L) $\phi$4 OF 8 on line 435. The final signal output thereof such FF3 420 occurring as Low signal (L) FF3 on line 469 will be gated in AND gate 424 by the time U occurrence of clock phase 1 as Low signal (L) $\phi$1 OF 8 on line 417. The High signal (H) EXER TIME-OUT CLEAR on line 453 resultant from the satisfaction of AND gate 424 will satisfy OR gate 420 and then cause the clearing of the EXER PRI FF 422 some 12 clock phases after the exerciser request was honored in priority as represented by signal (H) EXER REQ SELECT on line 461 going true, or High.

Continuing in FIG. 4, the delay circuit consisting of FF1 416, FF2 418, and FF3 420 which will suffice to clear the maintenance exerciser priority flip-flop EXER PRI FF 422 in the event of next-level priority and/or storage memory unit non-responsiveness to a prioritized request of such maintenance exerciser, thereby precluding, or forcing clear, the recognition of any memory time-out at such maintenance exerciser, is itself cleared and reinitialized by the normal occurrence of an acknowledge from the next-level priority and/or the storage memory banks. This occurs when the high condition of signal (H) ACKNOWLEDGE on line 403 sets, upon the time X occurrence of clock phase 4 as signal (L) $\phi$4 OF 8 on line 435, the flip-flop FF 408, producing as the set side signal therefrom High signal (H) RESUME on line 471. Such High signal (H) RESUME on line 471 is received at the clear CLR inputs of each of flip-flops FF1 416 through FF3 420, thereby clearing all such.

The improvement circuit of the present invention is seen in FIG. 4 is thusly seen to teach of the defeat, or clear, of the lock-up of a priority network, and the memory time-out to a requestor thereof such priority network, upon the non-responsiveness of a requested memory resource, such resources as a deeper level of priority and/or a storage memory bank, proceeding upon the prioritized request arising from a single requestor thereof such priority network. In FIG. 4, such requestor is suggested to be a maintenance exerciser, to which the lock-up of the priority network and the occurrence of a memory time-out will be precluded, or cleared. The reason why it is useful that a maintenance exerciser should be precluded from causing the lock-up of a priority network resultant to its requests, and the sensing of a memory time-out resultantly to such lock-up, is that such lock-up of the priority network is also causative of non-access, and time-out, to other requestors of the memory unit. If the maintenance exerciser is performing maintenance on a portion of the inoperative prioritization and/or storage memory banks which are non-responsive, and thusly normally causative of recurrence time-out fault condition, concurrently that other requestors of the memory unit are attempting to continue normal operations with remaining portions of the resource which is correctly responsive, it is not desirable that the maintenance exerciser should, by causing constant manifestation of the time-out fault condition, essentially preclude that other requestors should be able to obtain normal operations within the memory unit shared by all. The circuit of the present invention thusly improves the response of a memory unit, particularly within the priority logics section thereof, to the conduct of concurrent maintenance by a maintenance exerciser especially when such concurrent maintenance is causative of requests normally resultant in the memory time-out fault condition.

G. Timing Diagram of the Operation of the Present Invention

Figure 5A:
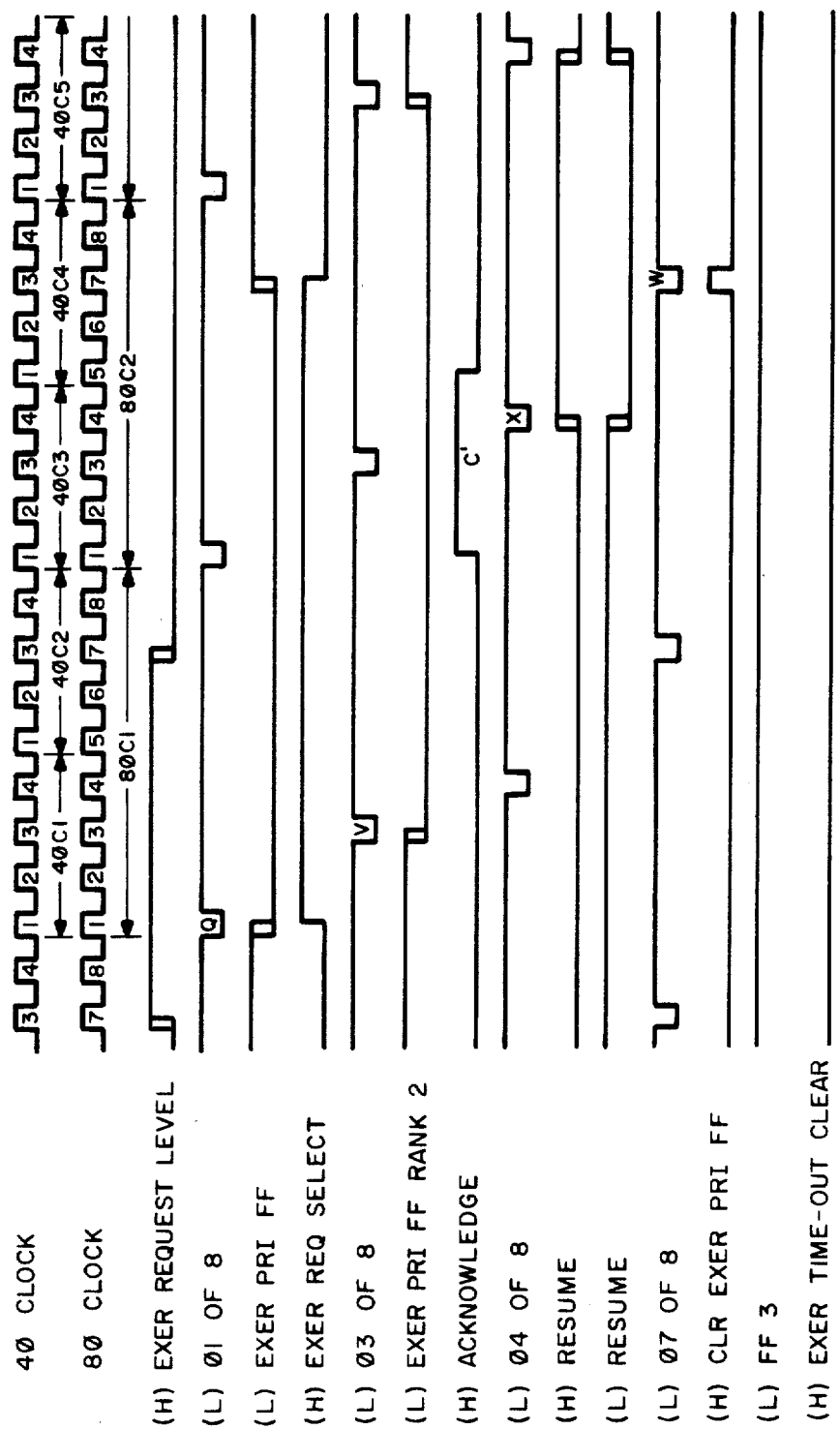
FIG. 5, consisting of FIG. 5a and FIG. 5b, respectively show a timing diagram of the operation of the circuit of the present invention shown in FIG. 4 when a normal acknowledge signal is received, and when such acknowledge signal is not received.
Figure 5B:
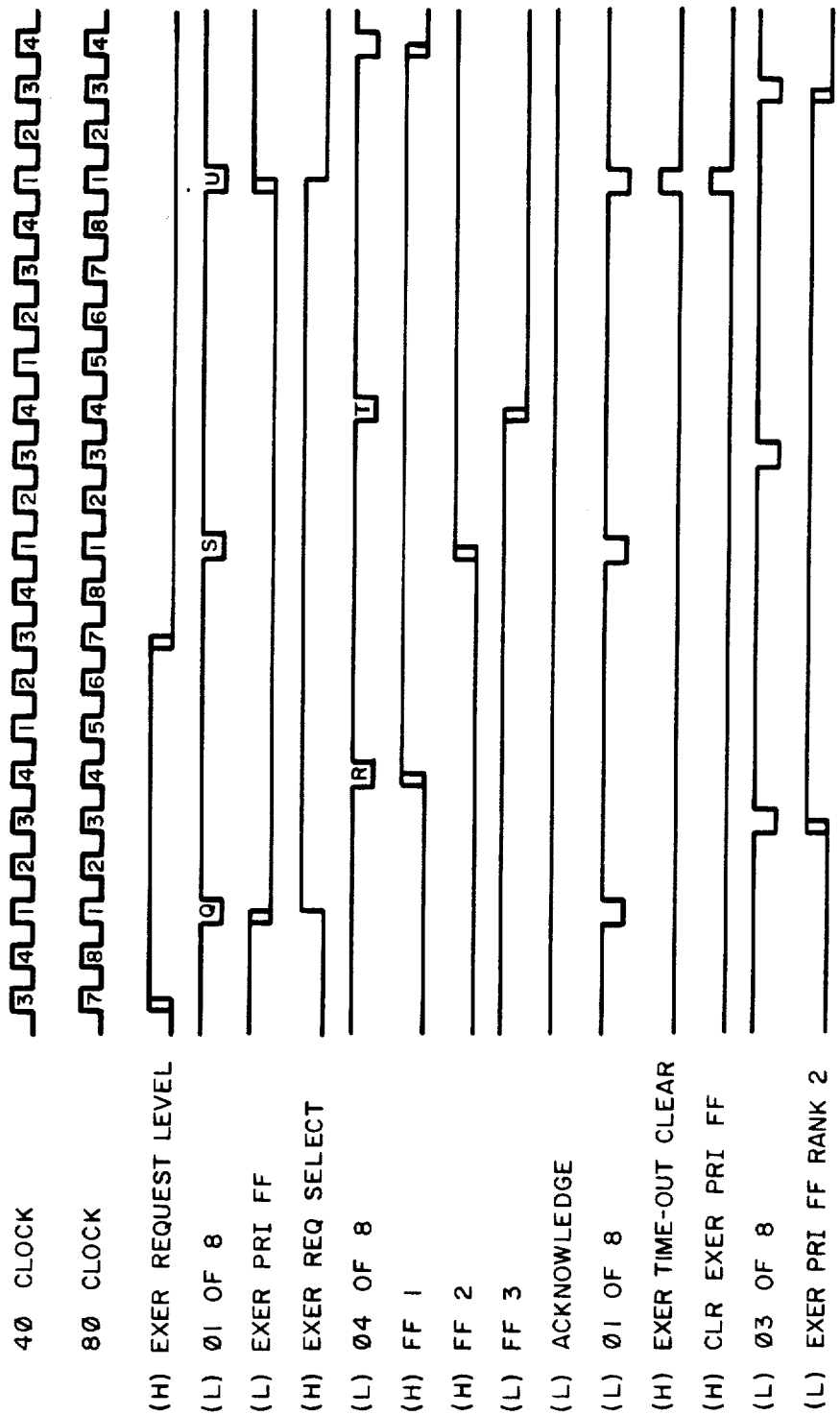

The timing of the present invention of forced clear of a memory time-out to a maintenance exerciser shown in FIG. 5, consisting of FIG. 5a and FIG. 5b. The timing of the operation of the circuit of FIG. 4 during normal operation when an acknowledge signal is received responsively to the prioritized request of the maintenance exerciser is shown in FIG. 5a. The timing of the operation of the circuit of FIG. 4 when, due to malfunction of next-level priority and/or a requested storage memory bank, no acknowledge signal to a prioritized request of the maintenance exerciser is returned, and the request of the maintenance exerciser must thusly be cleared from priority else a time-out will be experienced by the maintenance exerciser and possibly by other obstructed requestors, is shown in FIG. 5b.

Within FIG. 5 the timing is enabled by clock pulses of period 7.5 nanoseconds which pulses are numbered 1 through 8, ergo constituting an 8-phase clock shown as line 8$\phi$ CLOCK. Of reference primarily to related patent applications, these clock pulses of duration 7.5 nanoseconds are the selfsame coincident and identical clock pulses to those pulses labeled 1 through 4, ergo constituting a 4-phase clock, shown as line 4$\phi$ CLOCK. In the examples illustrated in FIG. 5a and FIG. 5b, a request is registered by the Maintenance Exerciser, resulting that signal (H) EXER REQUEST LEVEL should go High from that clock phase 7 to clock phase 7 which does gate the flip-flop which does give rise to such signal. At the Low occurrence at time Q of signal (L) $\phi$ OF 8, such request level signal is gated to set the exercise request flip-flop resulting in Low signals (L) EXER PRI FF output therefrom. By momentary reference to FIG. 4b, it may be recalled that such setting of the exerciser request flip-flop did give rise to High signal (H) EXER REQ SELECT.

In the example of FIG. 5a showing normal operation, responsively to the High condition of signal (H) EXER REQ SELECT then the second-level priority, bank availability permitting, does next return signal (H) AC- KNOWLEDGE during time C' from clock phase 1 to clock phase 5 of the second cycle of the 8-phase clock 8φC2. This signal is gated in order that it may be delayed by the Low occurrence of clock phase 4 at time X shown as signal (L) φ4 OF 8 to produce Low signal (L) RESUME and High signal (H) RESUME. During the Low occurrence of such signal (L) RESUME the Low occurrence of clock phase 7 at time W shown as signal (L) φ7 OF 8 does produce High signal (H) CLR EXER PRI FF clearing the maintenance exerciser request flip-flop, causing signal (L) EXER PRI FF to go High. Upon this occurrence, signal (H) EXER REQ SELECT may then go Low, indicating that the maintenance exerciser request has been serviced, the exerciser request is now to be serviced. Upon the next following clock phase 3 represented by signal (L) φ3 OF 8, such Low condition of signal (H) EXER REQ SELECT will allow the clearing of exerciser priority flip-flop rank 2, causing signal (L) EXER PRI FF RANK 2 to go High.

In the example of FIG. 5b showing operation in the event of malfunction or nonfunction of successive priority and/or storage memory bank circuits responsively to their receipt of the prioritized maintenance exerciser request as High signal (H) EXER REQ SELECT, no acknowledge signal to such prioritized request is received and signal (L) ACKNOWLEDGE remains High. Correspondingly, and by reference to FIG. 4b, the occurrences of clock phase 4, then clock phase 1, then clock phase 4, then clock phase 1 at respective times R, S, T, and U will allow the respective setting of flip-flops FF1 416, FF2 418, FF3 420 and the final satisfaction (at time U) of AND gate 424. The signal (H) EXER TIME-OUT CLEAR produced of such AND gate 424 becomes High, resulting in High signal (H) CLR EXER PRI FF and the resultant clearing of the exerciser priority flip-flop. This clearing causes signal (L) EXER PRI FF to return High and signal (H) EXER REQ SELECT to return Low as before, thus clearing the exerciser request, and any time-out which would have been resultant therefrom, from priority equivalently as such would have been cleared upon the acknowledgment of correctly functioning requested resource of the memory unit, the next successive priority logic and/or the storage memory banks accessed therethru.

While the present invention has been described with respect to a particular timing chain scheme for the institution of a particular delay upon the expiration of which the priority flip-flop to a particular maintenance exerciser requestor will be cleared, thereby freeing the priority logics for further cycles of prioritization and precluding of the occurrence of a memory time-out fault condition at such particular requestor, it is to be recognized that yet other equivalent schemes might be suggested to one of skill in the art upon a reading of the present specification. For example, the suspension of the occurrence of the memory time-out fault interrupt could be precluded, by clearing, to the requestors of other types than the maintenance exerciser. The preclusion of memory time-out fault conditions could be selectively controllably precluded to such requestors. Therefore, the present invention as set forth in the following claims should be interpreted to include all such equivalents as reasonably suggest themselves to a routineer in the art upon study of the preceding specification.

What is claimed is:

1. In a single large scale memory unit
containing a multiplicity of independently simultaneously operative storage memory banks, receiving from a maintenance exerciser type requestor one of a multiplicity of requestors' requests to inoperative, non-responding, ones of said multiplicity of simultaneously operative storage memory banks, concurrently to receiving from other requestor ones of said multiplicity of requestors' requests to correctly operative and responding ones of said multiplicity of simultaneously operative storage memory banks, prioritizing in a priority network the requests from all said multiplicity of requestors in order to apply a prioritized plurality of such requests to a like plurality of said multiplicity of simultaneously operative storage memory banks, an improvement to said priority network allowing that successive prioritizations may transpire even though each single one of said like plurality of simultaneously operative storage memory banks does not positively acknowledge of the receipt of one of said prioritized plurality of requests, said improvement to the priority network apparatus of a large scale memory unit comprising:

prioritization means
for prioritizing the requests of a multiplicity of requestors including the request of a maintenance exerciser type one of said multiplicity of requestors, for applying a prioritized plurality of said requests, including within said prioritized plurality of said requests said request of said maintenance exerciser type one of said multiplicity of requestors, to a like plurality port of a multiplicity of independently simultaneously operative storage memory banks, and for performing successive said prioritizing if, only if, and when each of said prioritized plurality of requests is acknowledged, else if any of said prioritized plurality of requests fail to be acknowledged then suffering that each one or ones of said multiplicity of requestors as did give rise to those request or requests which did fail to be acknowledged should suffer a time-out, meaning a prolonged interval within which successive said prioritizing will not transpire amongst and between any requests of any said multiplicity of requestors, after which said time-out interval said prioritizing may upon the presence of requests resume, and forced clear of a memory time-out to a maintenance exerciser means for providing, responsively to only that one prioritized request of said prioritized plurality of requests which did arise from said maintenance exerciser type one of said multiplicity of requestors, and conditionally only if an acknowledgment is not normally timely forthcoming from the one of said like plurality of storage memory banks which was requested by said one prioritized request which did arise from said maintenance exerciser type one of said multiplicity of requestors, a substitutionary acknowledgment to that said one prioritized request of said prioritized plurality of requests which did arise from said maintenance exerciser type one of said multiplicity of requestors, WHEREIN said substitutionary acknowledgment makes that said maintenance exerciser type one, only, of said multiplicity of requestors will not suffer said time-out, and does additionally make that said prioritization means will, all additional ones of said prioritized plurality of requests being acknowledged, immediately proceed to said performing successive said prioritizing without waiting said time-out interval.

2. The improvement to the priority network apparatus of a large scale memory unit of claim 1 wherein said forced clear of a memory time-out to a maintenance exerciser means further comprises:

forced clear of a memory time-out to a maintenance exerciser means comprising a time delay circuit for providing after a short fixed delay from only that one prioritized request of said prioritized plurality of requests which did arise from said maintenance exerciser type one of said multiplicity of requstors, and conditionally upon not being reset by an acknowledgment normally timely forthcoming from the one of said like plurality of storage memory banks which was requested by said one prioritized request which did arise from said maintenance exerciser type one of said multiplicity of requestors, a substitutionary acknowledgment to that said one prioritized request of said prioritized plurality of requests which did arise from said maintenance exerciser type one of said multiplicity of requestors, WHEREIN said substitutionary acknowledgment after said short fixed delay does make that said maintenance exerciser type one, only, of said multiplicity of requestors will not suffer said prolonged time-out, and does additionally make that said prioritization means will, all additional ones of said prioritized plurality of requests being acknowledged, after said short fixed delay proceed to said performing successive said prioritizing without waiting said prolonged time-out interval.

3. In a single large scale memory unit
containing a multiplicity of independently simultaneously operative storage memory banks,
receiving from a maintenance exerciser type requestor one of a multiplicity of requestors' requests to inoperative, non-resonding, ones of said multiplicity of simultaneously operative storage memory banks, concurrently to
receiving from other requestor ones of said multiplicity of requestors' requests to correctly operative and responding ones of said multiplicity of simultaneously operative storage memory banks,
prioritizing the requests from all said multiplicity of requestors in order to apply a prioritized plurality of such requests to a like plurality of said multiplicity of simultaneously operative storage memory banks,
an improvement to the method of said prioritizing to the end that that time-out which would be experienced by said maintenance exerciser type requestor one of any request to an inoperative, non-responding, one of said multiplicity of simultaneously operative storage memory banks will be forced clear, meaning precluded, from happening, said method comprising:

prioritizing in priority logics requests from a multiplicity of requestors to form a prioritized plurality of said requests;

applying said prioritized plurality of requests to a like plurality ones of a multiplicity of simultaneously operative storage memory banks;

producing at each of said like plurality of simultaneously operative storage memory banks which are correctly functionally operative an acknowledgment to a received one at said prioritized plurality of requests, while not producing at each of said like plurality of simultaneously operative storage memory banks which are inoperative to a received one of said prioritized plurality of requests;

If the one of said like plurality of simultaneously operative storage memory banks which receives that particular one of said prioritized plurality of requests which did arise from a maintenance exerciser type one of said multiplicity of requestors is inoperative, thusly not producing any acknowledgment THEN substitutionarily producing within said priority logics an acknowledgment signal ELSE IF said one of said like plurality of simultaneously operative storage memory banks which receives that particular one of said prioritized plurality of requests which did arise from a maintenance exerciser type one of said multiplicity of requestors is operative, thusly producing an acknowledgment THEN substitutionarily producing nothing;

receiving in priority logics the produced acknowledgments and any substitutionarily produced acknowledgment to each of said prioritized plurality of requests; then IF acknowledgment is received responsively to each of said prioritized plurality of requests THEN continuing with successive said prioritizing ELSE IF one or more of said prioritized plurality of requests THEN suspending to continue successive said prioritizing for such a prolonged period of time so as that at least that one or more requestors as did give rise to said one or more of said prioritized plurality of requests responsively to which acknowledgments were not received should each suffer a time-out, meaning said prolonged period of time within which said memory unit will not be responsive for successive said prioritizing;

whereby since said substitutionarily producing within said priority logics an acknowledgment signal does transpire whenever said one of said like plurality of simultaneously operative storage memory banks which received said one of said prioritized pluraity of requests which did arise from said maintenance exerciser type one of said multiplicity of requestors was inoperative, also said said producing at the storage memory bank an acknowledgment signal does transpire whenever said one of said like plurality of simultaneously operative storage memory banks which received said one of said prioritized plurality of request which did arise from said maintenance exerciser type one of said multiplicity of requestors was operative, then said time-out is precluded, or cleared, that such should suffer to happen to said maintenance exerciser type one of said multiplicity of requestors.

* * * * *